(12) United States Patent
Tsuji et al.

(10) Patent No.: US 10,435,868 B2
(45) Date of Patent: Oct. 8, 2019

(54) CONTROL SYSTEM FOR WHEEL LOADER, CONTROL METHOD THEREOF, AND METHOD OF CONTROLLING WHEEL LOADER

(71) Applicant: KOMATSU LTD., Tokyo (JP)

(72) Inventors: Hideki Tsuji, Komatsu (JP); Kaoru Yasuda, Komatsu (JP); Norifumi Nishizaka, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/571,111

(22) PCT Filed: Aug. 12, 2016

(86) PCT No.: PCT/JP2016/073733
§ 371 (c)(1),
(2) Date: Nov. 1, 2017

(87) PCT Pub. No.: WO2017/033769
PCT Pub. Date: Mar. 2, 2017

(65) Prior Publication Data
US 2018/0171594 A1 Jun. 21, 2018

(30) Foreign Application Priority Data
Aug. 24, 2015 (JP) .................. 2015-164481

(51) Int. Cl.
*E02F 9/26* (2006.01)
*G06T 11/60* (2006.01)
*H04N 5/232* (2006.01)
*B60R 1/00* (2006.01)
(Continued)

(52) U.S. Cl.
CPC ............... *E02F 9/26* (2013.01); *E02F 9/261* (2013.01); *E02F 9/264* (2013.01); *G06T 11/60* (2013.01); *H04N 5/23238* (2013.01); *B60R 1/00* (2013.01); *B60R 2300/105* (2013.01); *B60R 2300/205* (2013.01); *B60R 2300/303* (2013.01); *B60R 2300/60* (2013.01); *E02F 3/34* (2013.01); *G02B 27/0101* (2013.01); *G02B 2027/014* (2013.01);
(Continued)

(58) Field of Classification Search
CPC ............... B60R 1/00; B60R 2300/105; B60R 2300/205; B60R 2300/303; B60R 2300/60; E02F 3/34; E02F 9/26; E02F 9/264; G02B 2027/0138; G02B 2027/014; G02B 27/0101; G06T 11/60
See application file for complete search history.

(56) References Cited

U.S. PATENT DOCUMENTS

| 2010/0289899 A1 | 11/2010 | Hendron et al. |
| 2014/0188333 A1 | 7/2014 | Friend |
| 2015/0116495 A1* | 4/2015 | Kowatari ............... E02F 9/26 348/148 |

FOREIGN PATENT DOCUMENTS

| CN | 106149775 A | 11/2016 |
| CN | 106149775 B | 11/2018 |
| EP | 3093397 A1 | 11/2016 |

(Continued)

*Primary Examiner* — Sing-Wai Wu
(74) *Attorney, Agent, or Firm* — Drinker Biddle & Reath LLP

(57) ABSTRACT

A control system for a work vehicle includes a display and a control unit which has the display show a perspective image in which at least a part of a work implement of a wheel loader or a vessel of a loaded vehicle is seen through.

18 Claims, 26 Drawing Sheets

(51) Int. Cl.
  *E02F 3/34* (2006.01)
  *G02B 27/01* (2006.01)
(52) U.S. Cl.
  CPC .............. *G02B 2027/0138* (2013.01); *G02B 2027/0141* (2013.01)

(56) References Cited

FOREIGN PATENT DOCUMENTS

| | | |
|---|---|---|
| JP | H03-208921 A | 9/1991 |
| JP | H10-299032 A | 11/1998 |
| JP | 2008-241300 A | 10/2008 |
| JP | 2008-303574 A | 12/2008 |
| JP | 2015-21246 A | 2/2015 |
| WO | WO-2016/092684 A1 | 6/2016 |

\* cited by examiner (A)

(B)

CONTROL SYSTEM FOR WHEEL LOADER, CONTROL METHOD THEREOF, AND METHOD OF CONTROLLING WHEEL LOADER

TECHNICAL FIELD

The present invention relates to a control system for a wheel loader.

BACKGROUND ART

A wheel loader has conventionally been used to move soil, rocks and stones, and other objects (which are also referred to as a loaded object) from one place to another. For example, a wheel loader can load soil, rocks and stones, and/or other objects on another transportation machine such as a dump truck so that the dump truck can thereafter transport the objects to a waste site.

The wheel loader is provided with a work implement which performs such works as excavation and loading. In general, an operator performs such works as excavation and loading while the operator watches a state of the work implement provided in front of the wheel loader. The work implement itself, however, may block a field of view of the operator, and as a result of inability to watch a region, efficiency in works by the work implement has been lowered.

PTD 1 shows assistance for checking surroundings of a hydraulic excavator by arranging cameras around the hydraulic excavator, picking up images, and generating images from a point of view from above.

CITATION LIST

Patent Document

PTD 1: Japanese Patent Laying-Open No. 2015-21246

SUMMARY OF INVENTION

Technical Problem

In PTD 1, however, the images from the point of view from above are shown for the purpose of monitoring of the surroundings of the hydraulic excavator and hence they are different from the field of view of the operator. It is difficult for the operator to intuitively operate the work implement, and improvement in work efficiency has been insufficient.

The present invention was made to solve the problems above, and an object is to provide a control system for a wheel loader which can improve work efficiency, a control method thereof, and a method of controlling a wheel loader.

Other tasks and novel features will become apparent from the description herein and the attached drawings.

Solution to Problem

A control system for a wheel loader according to one aspect includes a display and a control unit, which causes the display to show a perspective image in which at least a part of a work implement of the wheel loader or a vessel of a loaded vehicle is seen through.

According to the present invention, the control unit causes the display to show a perspective image in which at least a part of the work implement or the vessel of the loaded vehicle is seen through. Therefore, the operator can intuitively operate the work implement and work efficiency can be improved.

Preferably, the control unit causes the display to show a contour line of a bucket of the work implement or the vessel as being synthesized with the perspective image. According to the above, since the contour line of the bucket of the work implement or the vessel is shown on the display as being synthesized with the perspective image, the outer geometry can readily be known, the operator can intuitively operate the work implement, and work efficiency can be improved.

Preferably, the control unit causes the display to show the contour line of the bucket in a side view as being synthesized with the perspective image of the inside of the bucket. According to the above, since the contour line of the bucket in the side view is shown on the display as being synthesized with the perspective image of the inside of the bucket, the operator can intuitively operate the work implement from the side view and work efficiency can be improved.

Preferably, the control unit causes the display to show the contour line of the bucket from a point of view at an operator's seat as being synthesized with the perspective image of the inside of the bucket. According to the above, since the contour line of the bucket from the point of view at the operator's seat is shown on the display as being synthesized with the perspective image of the inside of the bucket, the operator can intuitively operate the work. implement from the point of view at the operator's seat and work efficiency can be improved.

Preferably, the control unit includes a blocked region extraction unit which extracts at least a part of a Hocked region where a field of view of an operator from a point of view at an operator's seat of the wheel loader on the display is blocked and a representation control unit, which causes the display to show the perspective image on a line of sight of the operator beyond the blocked region as being synthesized with a region within a contour line of the blocked region extracted by the blocked region extraction unit, with the contour line of the blocked region being defined as a boundary. According to the above, since the representation control unit causes the display to show the perspective image on the line of sight of the operator beyond the blocked region as being synthesized, the operator can intuitively operate the work implement and work efficiency can be improved.

Preferably, the display is an optically transparent display. According to the above, since the optically transparent display shows the perspective image on the line of sight of the operator beyond the blocked region as being synthesized, the operator can more intuitively operate the work implement and work efficiency can be improved.

Preferably, the blocked region extraction unit extracts at least a part of the blocked region. based on an operation instruction from the operator. According to the above, since the blocked region is specified based on an operation instruction from the operator, load imposed on processing in image analysis in extraction of the blocked region can be reduced.

Preferably, the control system for a wheel loader further includes an image pick-up portion which obtains image data and an image extraction unit which extracts the perspective image on the line of sight of the operator beyond the blocked region based on the image data obtained by the image pick-up portion. The representation control unit causes the display to show the perspective image extracted by the image extraction unit as being synthesized with the region within the contour line of the blocked region extracted by the blocked region extraction unit, with the contour line of the blocked region being defined as the boundary. According to the above, since the perspective image is extracted based on the image data, an actual perspective image on the line of sight of the operator beyond the blocked region is synthesized. Therefore, the operator can intuitively operate the work implement and work efficiency can be improved.

Preferably, the blocked region extraction unit extracts the blocked region where the field of view of the operator from the point of view at the operator's seat on the display is blocked by the bucket of the work implement during excavation with the bucket. The image extraction unit extracts the perspective image of the inside of the bucket on the line of sight of the operator beyond the extracted blocked region during the excavation. The representation control unit causes the display to show the perspective image of the inside of the bucket extracted by the image extraction unit as being synthesized with the region within the contour line of the bucket extracted by the blocked region extraction unit, with the contour line of the bucket being defined as the boundary, during the excavation, According to the above, since the perspective image of the inside of the bucket is synthesized during excavation, the operator can intuitively operate the work implement during excavation and work efficiency can be improved.

Preferably, the work implement includes a work implement link which connects the bucket and a vehicular main body to each other. The blocked region extraction unit extracts the blocked region where the field of view of the operator from the point of view at the operator's seat on the display is blocked by the work implement link during loading on the vessel. The image extraction unit extracts the perspective image of the part of the vessel on the line of sight of the operator beyond the extracted blocked region during the loading. The representation control unit has the display show the perspective image extracted by the image extraction unit as synthesized with the region within the contour line of the work implement link extracted by the blocked region extraction unit, with the contour line of the work implement link being defined as the boundary, during the loading. According to the above, since the perspective image of the vessel is synthesized in loading, the operator can intuitively operate the work implement during loading and work efficiency can be improved.

Preferably, the blocked region extraction unit extracts the blocked region where the field of view of the operator from the point of view at the operator's seat on the display is blocked by the vessel during soil ejection from the bucket. The image extraction unit extracts the perspective image of the inside of the vessel on the line of sight of the operator beyond the extracted blocked region during the soil ejection. The representation control unit causes the display to show the perspective image of the inside of the vessel extracted by the image extraction unit as being synthesized with the region within the contour line of the vessel extracted by the blocked region extraction unit, with the contour line of the vessel being defined as the boundary, during the soil ejection. According to the above, since the perspective image of the inside of the vessel is synthesized during soil ejection, the operator can intuitively operate the work implement during soil ejection and work efficiency can be improved.

Preferably, the blocked region extraction unit further extracts the blocked region where the field of view of the operator from the point of view at the operator's seat on the display is blocked by the bucket during soil ejection from the bucket. The image extraction unit further extracts the perspective image of the inside of the bucket on the line of sight of the operator beyond the extracted blocked region during the soil ejection. The representation control unit further synthesizes the perspective image of the inside of the bucket extracted by the image extraction unit with the region within the contour line of the bucket extracted by the blocked region extraction unit, with the contour line of the bucket being defined as the boundary, during the soil ejection, and has the synthesized image shown. According to the above, since the perspective image of the inside of the bucket is synthesized during soil ejection, the operator can intuitively operate the work implement during soil ejection and work efficiency can be improved.

A control method of a control system for a wheel loader according to one aspect includes inputting picked-up image data, extracting at least a part of a blocked region where a field of view of an operator from a point of view at an operator's seat of the wheel loader is blocked by at least a part of a work implement or a loaded vehicle from the image data, creating image synthesis data by synthesizing a perspective image on a line of sight of the operator beyond the extracted blocked region, and showing the image synthesis data on a display.

According to the control method of the control system according to the present invention, since the perspective image on the line of sight of the operator beyond the blocked region is synthesized and the synthesized image is shown on the display, the operator can intuitively operate the work implement and work efficiency can be improved.

A method of controlling a wheel loader according to one aspect includes obtaining picked-up image data, extracting at least a part of a blocked region where a field of view of an operator from a point of view at an operator's seat of the wheel loader is blocked by at least a part of a work implement or a loaded vehicle from the image data, creating image synthesis data by synthesizing a perspective image on a line of sight of the operator beyond the extracted blocked region, and showing the image synthesis data on a display.

According to the method of controlling a wheel loader in the present invention, since the perspective image on the line of sight of the operator beyond the blocked region is synthesized and the synthesized image is shown on the display, the operator can intuitively operate the work implement and work efficiency can be improved.

Advantageous Effects of Invention

The control system for a wheel loader, the control method thereof, and the method of controlling a wheel loader according to the present invention can improve work efficiency.

DESCRIPTION OF EMBODIMENTS

An embodiment will be described below based on figures. In the description below, "up (above)," "down (below)," "front", "rear", "left", and "right" are terms with an operator seated at an operator's seat being defined as the reference. A wheel loader or a dump truck representing one example of a "loaded vehicle" will be described with reference to the drawings.

(First Embodiment)
<Work Processing>

Figure 1:
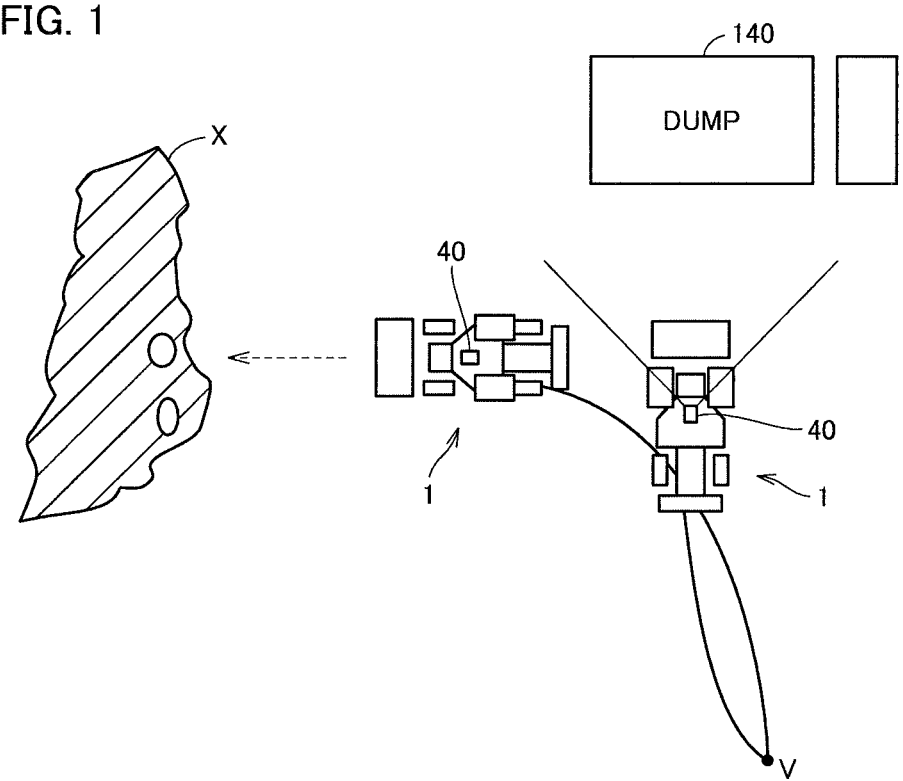
FIG. 1 illustrates overview of work processing based on a first embodiment.

FIG. 1 illustrates overview of work processing based on a first embodiment.

FIG. 1 shows a schematic configuration in which a wheel loader and a loaded vehicle are arranged at a work site such as a stone crush and a mine by way of example.

A loaded object X is shown at the work site.

A wheel loader 1 performs an excavation work for excavating loaded object X such as deposited soil and a loading work for loading the loaded object on a loaded vehicle 140.

Wheel loader 1 performs the excavation work for excavating loaded object X and thereafter moves rearward while it revolves to a point V as facing loaded vehicle 140. The wheel loader moves forward from point V toward loaded vehicle 140 and performs the loading work for loading loaded object X on loaded vehicle 140. Loaded vehicle 140 is arranged at a position designated in advance such that the loading work by wheel loader 1 can efficiently be performed. A camera 40 is arranged on a roof side of wheel loader 1. Though one camera 40 is provided, a plurality of cameras are desirably arranged.

<Overall Configuration of Wheel Loader and Loaded Vehicle>

Figure 2:
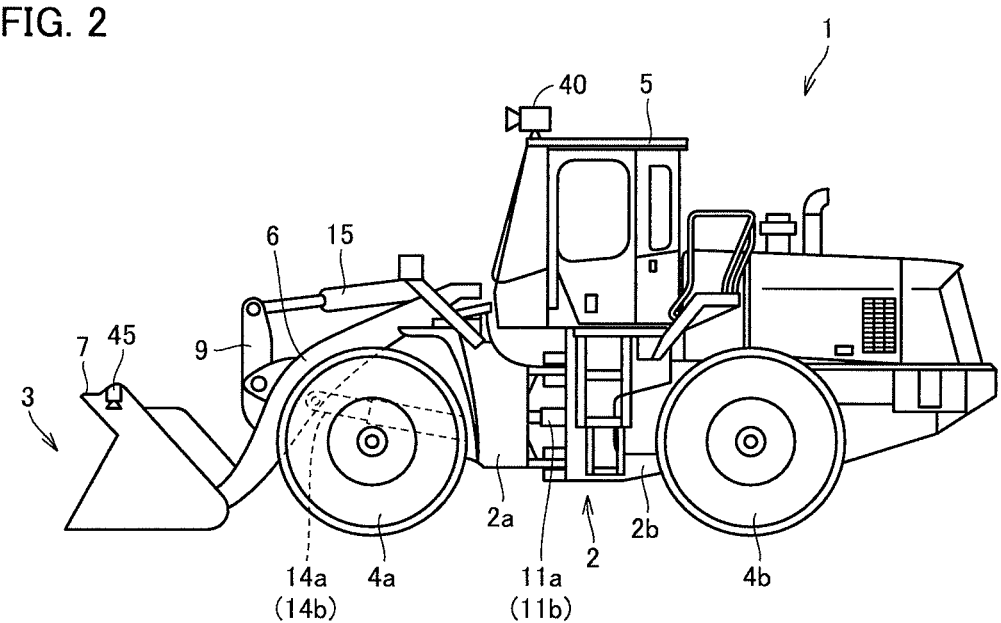
FIG. 2 shows appearance of a wheel loader 1 based on the first embodiment.

FIG. 2 shows appearance of wheel loader 1 based on the first embodiment.

Figure 3:
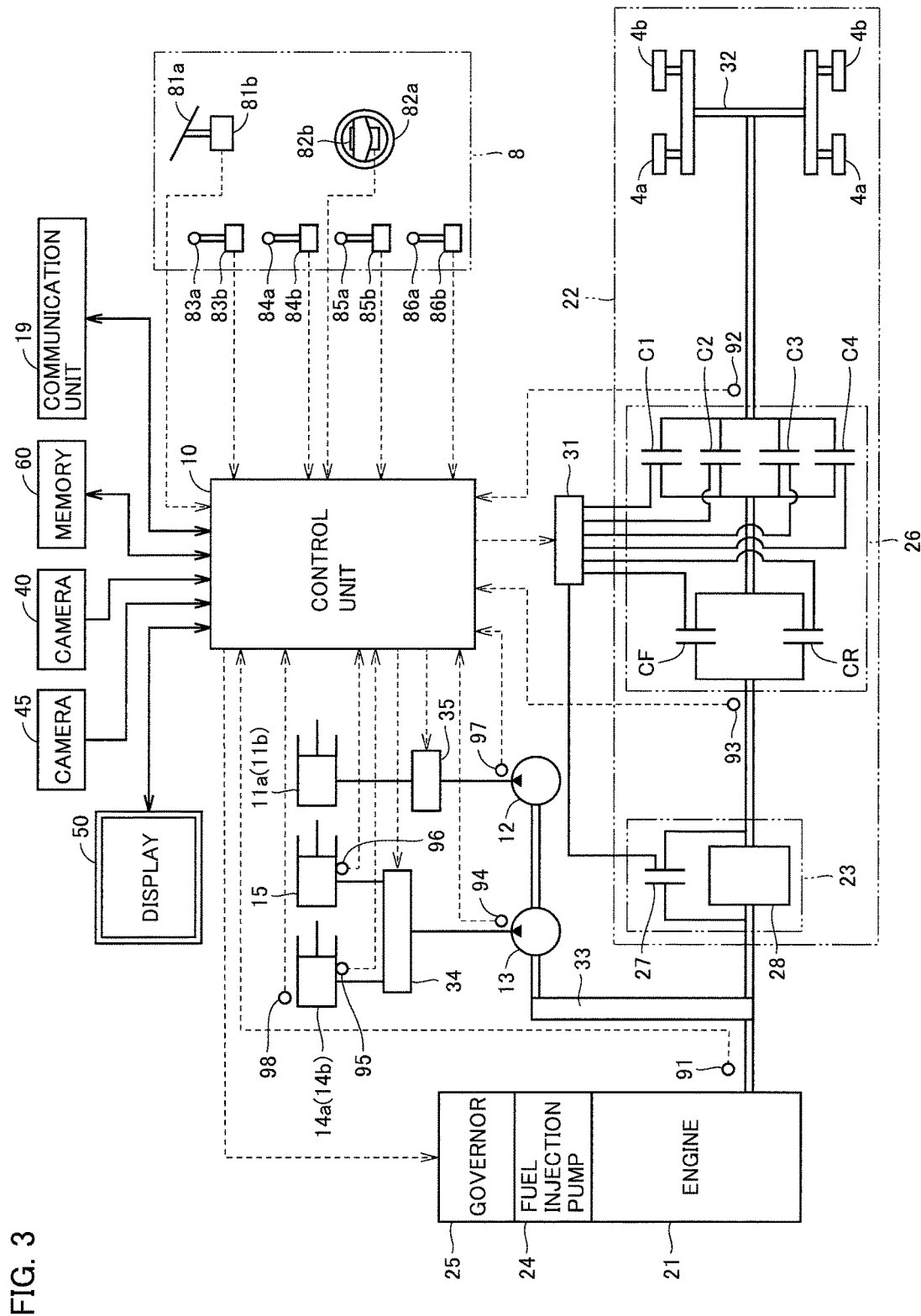
FIG. 3 is a schematic diagram showing a configuration of wheel loader 1 based on the first embodiment.

FIG. 3 is a schematic diagram showing a configuration of wheel loader 1 based on the first embodiment.

As shown in FIGS. 2 and 3, wheel loader 1 is mobile as wheels 4a and 4b are rotationally driven, and can perform a desired work with a work implement 3.

Wheel loader 1 includes a vehicular body frame 2, work implement 3, wheels 4a and 4b, and an operator's cab 5.

Vehicular body frame 2 has a front vehicular body portion 2a and a rear vehicular body portion 2b. Front vehicular body portion 2a and rear vehicular body portion 2b are coupled to each other in a manner swingable in a lateral direction.

A pair of steering cylinders 11a and 11b is provided across front vehicular body portion 2a and rear vehicular body portion 2b. Steering cylinders 11a and 11 b are hydraulic cylinders driven by a hydraulic oil from a steering pump 12 (see FIG. 3). As steering cylinders 11a and 11b extend and contract, front vehicular body portion 2a swings with respect to rear vehicular body portion 2b. Thus, a direction of travel of the vehicle is changed.

FIGS. 2 and 3 show only one of steering cylinders 11a and 11b and do not show the other.

Work implement 3 and a pair of wheels 4a are attached to front vehicular body portion 2a. Work implement 3 is driven by the hydraulic oil from a work implement pump 13 (see FIG. 3). Work implement 3 includes a boom 6, a pair of lift cylinders 14a and 14b, a bucket 7, a bell crank 9, and a bucket cylinder 15.

Boom 6 is rotatably supported by front vehicular body portion 2a. Lift cylinders 14a and 14b have one ends attached to front vehicular body portion 2a. Lift cylinders 14a and 14b have the other ends attached to boom 6. As lift cylinders 14a and 14b extend and contract owing to the hydraulic oil from work implement pump 13, boom 6 vertically swings.

FIGS. 2 and 3 show only one of lift cylinders 14a and 14b and do not show the other.

Bucket 7 is rotatably supported at a tip end of boom 6. Bucket cylinder 15 has one end attached to front vehicular body portion 2a. Bucket cylinder 15 has the other end attached to bucket 7 with bell crank 9 being interposed. As bucket cylinder 15 extends and contracts owing to the hydraulic oil from work implement pump 13, bucket 7 vertically swings.

In the present example, boom 6 and lift cylinders 14a and 14b which couple bucket 7 and front vehicular body portion 2a to each other are also referred to as a work implement link.

Operator's cab 5 and a pair of wheels 4b are attached to rear vehicular body portion 2b. Operator's cab 5 is placed on vehicular body frame 2 and a seat where an operator is seated and an operation portion 8 which will be described later are mounted inside.

As shown in FIG. 3, wheel loader 1 includes an engine 21 as a drive source, a traveling apparatus 22, work implement pump 13, steering pump 12, operation portion 8, and a control unit 10.

Engine 21 is a diesel engine and power of engine 21 is controlled by regulating an amount of fuel injected into a cylinder. Such regulation is achieved by control of an electronic governor 25 attached to a fuel injection pump 24 of engine 21 by control unit 10. Generally, an all speed control type governor is employed as governor 25, and an engine speed and an amount of fuel injection are regulated in accordance with a load such that an engine speed attains to a target speed in accordance with a position of an accelerator which will be described later. Governor 25 increases and decreases an amount of fuel injection such that there is no difference between a target speed and an actual engine speed. An engine speed is detected by an engine speed sensor 91. A detection signal from engine speed sensor 91 is input to control unit 10.

Traveling apparatus 22 is an apparatus for running a vehicle with drive force from engine 21. Traveling apparatus 22 includes a torque converter device 23, a transmission 26, and wheel 4a and wheel 4b described above.

Torque converter device 23 includes a lock-up clutch 27 and a torque converter 28. Lock-up clutch 27 can switch between a coupled state and a decoupled state. While lock-up clutch 27 is in the decoupled state, torque converter 28 transmits drive force from engine 21 with an oil serving as a medium. While lock-up clutch 27 is in the coupled state, an input side and an output side of torque converter 28 are directly coupled to each other. Lock-up clutch 27 is a hydraulically activated clutch and switching between the coupled state and the decoupled state is made by control of supply of the hydraulic oil to lock-up clutch 27 by control unit 10 with a clutch control valve 31 being interposed.

Transmission 26 includes a forward clutch CF corresponding to a forward drive gear and a reverse clutch CR corresponding to a reverse drive gear. With switching between a coupled state and a decoupled state of forward clutch CF and reverse clutch CR, switching between forward drive and reverse drive of the vehicle is made. While both of forward clutch CF and reverse clutch CR are in the decoupled state, the vehicle is in a neutral state. Transmission 26 includes a plurality of velocity stage clutches C1 to C4 corresponding to a plurality of velocity stages and can change a reduction gear ratio in a plurality of stages. For example, transmission 26 is provided with four velocity stage clutches C1 to C4 and the velocity stages can be switched among four stages from a first gear to a fourth gear. Each of velocity stage clutches C1 to C4 is a hydraulically activated hydraulic clutch. The hydraulic oil is supplied from a not-shown hydraulic pump through clutch control valve 31 to velocity stage clutches C1 to C4. Clutch control valve 31 is controlled by control unit 10 to control supply of the hydraulic oil to velocity stage clutches C1 to C4, so that switching between the coupled state and the decoupled state of each of velocity stage clutches C1 to C4 is made.

An output shaft of transmission 26 is provided with a T/M output speed sensor 92 which detects a speed of the output shaft of transmission 26. A detection signal from T/M output speed sensor 92 is input to control unit 10. Control unit 10 calculates a vehicle speed based on a detection signal from T/M output speed sensor 92. Therefore, T/M output speed sensor 92 functions as a vehicle speed detection portion which detects a vehicle speed. A sensor which detects a rotation speed of other portions instead of the output shaft of transmission 26 may be employed as a vehicle speed sensor. Drive force output from transmission 26 is transmitted to wheels 4a and 4b through a shaft 32. The vehicle thus travels. A speed of an input shaft of transmission 26 is detected by a T/M input speed sensor 93. A detection signal from T/M input speed sensor 93 is input to control unit 10.

Some of drive force from engine 21 is transmitted to work implement pump 13 and steering pump 12 through a PTO shaft 33. Work implement pump 13 and steering pump 12 are hydraulic pumps driven by drive force from engine 21. The hydraulic oil delivered from work implement pump 13 is supplied to lift cylinders 14a and 14b and bucket cylinder 15 through a work implement control valve 34. The hydraulic oil delivered from steering pump 12 is supplied to steering cylinders 11a and 11b through a steering control valve 35. Thus, work implement 3 is driven by some of drive force from engine 21.

A pressure of the hydraulic oil delivered from work implement pump 13 is detected by a first hydraulic sensor 94. A pressure of the hydraulic oil supplied to lift cylinders 14a and 14b is detected by a second hydraulic sensor 95. Specifically, second hydraulic sensor 95 detects a hydraulic pressure in a cylinder bottom chamber to which the hydraulic oil is supplied when lift cylinders 14a and 14b extend. A pressure of the hydraulic oil supplied to bucket cylinder 15 is detected by a third hydraulic sensor 96. Specifically, third hydraulic sensor 96 detects a hydraulic pressure in a cylinder bottom chamber to which the hydraulic oil is supplied when bucket cylinder 15 extends. A pressure of the hydraulic oil delivered from steering pump 12 is detected by a fourth hydraulic sensor 97. Detection signals from first hydraulic sensor 94 to fourth hydraulic sensor 97 are input to control unit 10.

Operation portion 8 is operated by an operator. Operation portion 8 includes an accelerator operation member 81a, an accelerator operation detection device 81b, a steering operation member 82a, a steering operation detection device 82b, a boom operation member 83a, a boom operation detection device 83b, a bucket operation member 84a, a bucket operation detection device 84b, a transmission operation member 85a, a transmission operation detection device 85b, an FR operation member 86a, and an FR operation detection device 86b.

Accelerator operation member 81a is implemented, for example, by an accelerator pedal and operated in order to set a target speed of engine 21. Accelerator operation detection device 81b detects a position of accelerator operation member 81a. Accelerator operation detection device 81b outputs a detection signal to control unit 10.

Steering operation member 82a is implemented, for example, by a steering wheel and operated to operate a direction of travel of a vehicle. Steering operation detection device 82b detects a position of steering operation member 82a and outputs a detection signal to control unit 10. Control unit 10 controls steering control valve 35 based on a detection signal from steering operation detection device 82b. Thus, steering cylinders 11a and 11b extend and contract and a direction of travel of the vehicle is changed.

Boom operation member 83a and bucket operation member 84a are implemented, for example, by an operation lever and operated in order to operate work implement 3. Specifically, boom operation member 83a is operated to operate boom 6. Bucket operation member 84a is operated in order to operate bucket 7. Boom operation detection device 83*b* detects a position of boom operation member 83*a*. Bucket operation detection device 84*b* detects a position of bucket operation member 84*a*. Boom operation detection device 83*b* and bucket operation detection device 84*b* output detection signals to control unit 10. Control unit 10 controls work implement control valve 34 based on detection signals from boom operation detection device 83*b* and bucket operation detection device 84*b*. Thus, lift cylinders 14*a* and 14*b* and bucket cylinder 15 extend and contract and boom 6 and bucket 7 operate. Work implement 3 is provided with a boom angle detection device 98 which detects a boom angle. A boom angle refers to an angle lying between a line connecting a rotation support center of front vehicular body portion 2*a* and boom 6 and a rotation support center of boom 6 and bucket 7 to each other and a line connecting axial centers of front and rear wheels 4*a* and 4*b* to each other. Boom angle detection device 98 outputs a detection signal to control unit 10. Control unit 10 calculates a height position of bucket 7 based on a boom angle detected by boom angle detection device 98. Therefore, boom angle detection device 98 functions as a height position detection portion which detects a height of bucket 7.

Transmission operation member 85*a* is implemented, for example, by a shift lever. Transmission operation member 85*a* is operated in order to set an upper limit of a velocity stage when an automatic transmission mode is selected. For example, when transmission operation member 85*a* is set to the third gear, transmission 26 is changed within a range from the second gear to the third gear and is not set to the fourth gear. When a manual transmission mode is selected, transmission 26 is changed to a velocity stage set with transmission operation member 85*a*. Transmission operation detection device 85*b* detects a position of transmission operation member 85*a*. Transmission operation detection device 85*b* outputs a detection signal to control unit 10. Control unit 10 controls speed change by transmission 26 based on a detection signal from transmission operation detection device 85*b*. Switching between the automatic transmission mode and the manual transmission mode is made by an operator with a not-shown transmission mode switching member.

FR operation member 86*a* is operated to switch between forward drive and reverse drive of the vehicle. FR operation member 86*a* can be set to each of a forward drive position, a neutral position, and a reverse drive position. FR operation detection device 86*b* detects a position of FR operation member 86*a*. FR operation detection device 86*b* outputs a detection signal to control unit 10. Control unit 10 controls clutch control valve 31 based on a detection signal from FR operation detection device 86*b*. Forward clutch CF and reverse clutch CR are thus controlled so that switching among forward drive, reverse drive, and the neutral state of the vehicle is made.

Control unit 10 is generally implemented by reading of various programs by a central processing unit (CPU).

Control unit 10 is connected to a memory 60. Memory 60 functions as a work memory and stores various programs for implementing functions of the wheel loader.

Control unit 10 sends an engine command signal to governor 25 in order to obtain a target speed in accordance with a position of the accelerator.

Control unit 10 is connected to camera 40. Control unit 10 accepts input of image data picked up by camera 40. Camera 40 is provided on a roof side of operator's cab 5 of wheel loader 1. A direction of a line of sight of camera 40 is the same as a direction of line of sight of an operator who is seated at operator's cab 5 of wheel loader 1. The direction of line of sight is horizontal in the present example.

Control unit 10 is also connected to a camera 45. Control unit 10 accepts input of image data picked up by camera 45. Camera 45 is provided inside bucket 7. A line of sight of camera 45 is oriented in a direction of image pick-up of the inside of bucket 7.

Control unit 10 is also connected to display 50.

Control unit 10 is also connected to a communication unit 19 provided to be able to communicate with the outside.

Figure 4:
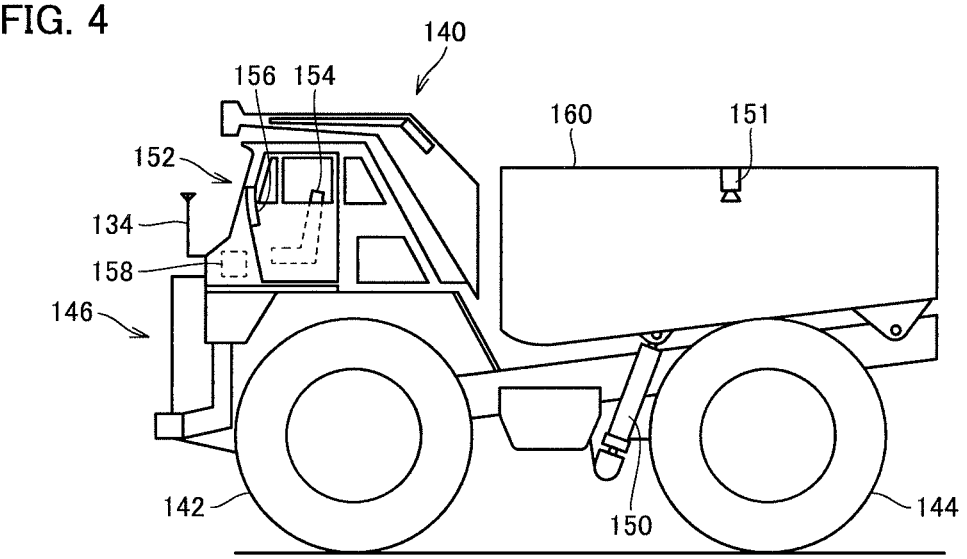
FIG. 4 shows appearance of a loaded vehicle 140 according to the first embodiment.

FIG. 4 shows appearance of loaded vehicle 140 according to the first embodiment.

FIG. 4 shows an example of a dump truck representing loaded vehicle 140.

Loaded vehicle 140 can be self-propelled, for example, as wheels 142 and 144 are rotationally driven. Loaded vehicle 140 includes an engine 146 such as a diesel engine as a drive source for driving wheels 142 and 144 and one or more of other components.

Loaded vehicle 140 includes a vessel 160 on which a loaded object such as soil can be loaded, an operator's cab 152, a control device 158, a communication device 134, and various actuators for operating various detectors and/or sensors and components.

Vessel 160 is operated to a soil ejection position, for example, with an actuator 150 being interposed.

Operator's cab 152 includes an operator's platform which is closed or partially closed, and includes a driver's seat 154, an operation portion (not shown), and a display 156.

Control device 158 accepts a result of detection by the detector and controls various actuators as necessary. Control device 158 includes a central processing unit (CPU), a memory, and various input and output peripherals.

Communication device 134 is connected to control device 158 and provided to be able to transmit and receive information through data communication with communication unit 19 of wheel loader 1.

Vessel 160 is provided with a camera 151. Camera 151 can obtain an image of the inside of the vessel. The obtained image can also be transmitted to wheel loader 1 through communication device 134.

<Control Configuration>

Figure 5:
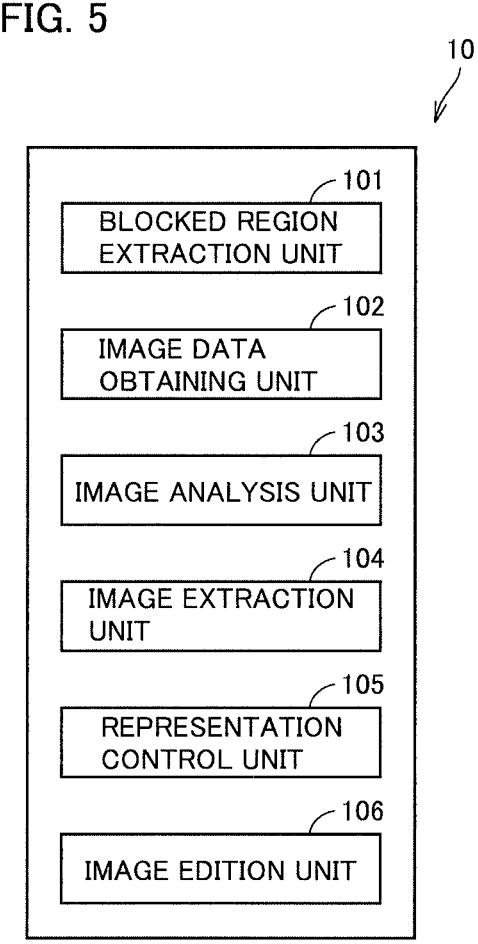
FIG. 5 illustrates a functional block of a control unit 10 of wheel loader 1 based on the first embodiment.

FIG. 5 illustrates a functional block of control unit 10 of wheel loader 1 based on the first embodiment.

As shown in FIG. 5, control unit 10 implements a functional block by executing various programs stored in memory 60.

Control unit 10 has display 50 show a perspective image in which at least a part of work implement 3 of wheel loader 1 or vessel 160 of loaded vehicle 140 is seen through.

Specifically, control unit 10 includes a blocked region extraction unit 101, an image data obtaining unit 102, an image analysis unit 103, an image extraction unit 104, a representation control unit 105, and an image edition unit 106.

Blocked region extraction unit 101 extracts at least a part of a blocked region where a field of view of an operator from a point of view at an operator's seat of wheel loader 1 on the display is blocked by work implement 3 or loaded vehicle 140. The point of view at the operator's seat refers to a point of view of an operator who is seated at the operator's seat.

Image data obtaining unit 102 obtains image data picked up by camera 40 and camera 45.

Image analysis unit 103 performs processing for analyzing the image data picked up by camera 40 and camera 45.

Image extraction unit 104 extracts a perspective image on the line of sight of the operator beyond the blocked region based on the image data obtained by image data obtaining unit 102.

Image edition unit 106 edits an image for synthesis of the perspective image extracted by image extraction unit 104 with the blocked region.

Representation control unit 105 has display 50 show the perspective image on the line of sight of the operator beyond the blocked region as being synthesized with a region within a contour line of the blocked region extracted by blocked region extraction unit 101, with the contour line of the blocked region being defined as the boundary. Representation control unit 105 has display 50 show the perspective image edited by image edition unit 106 as being synthesized with the region within the contour line of the blocked region.

Figure 6:
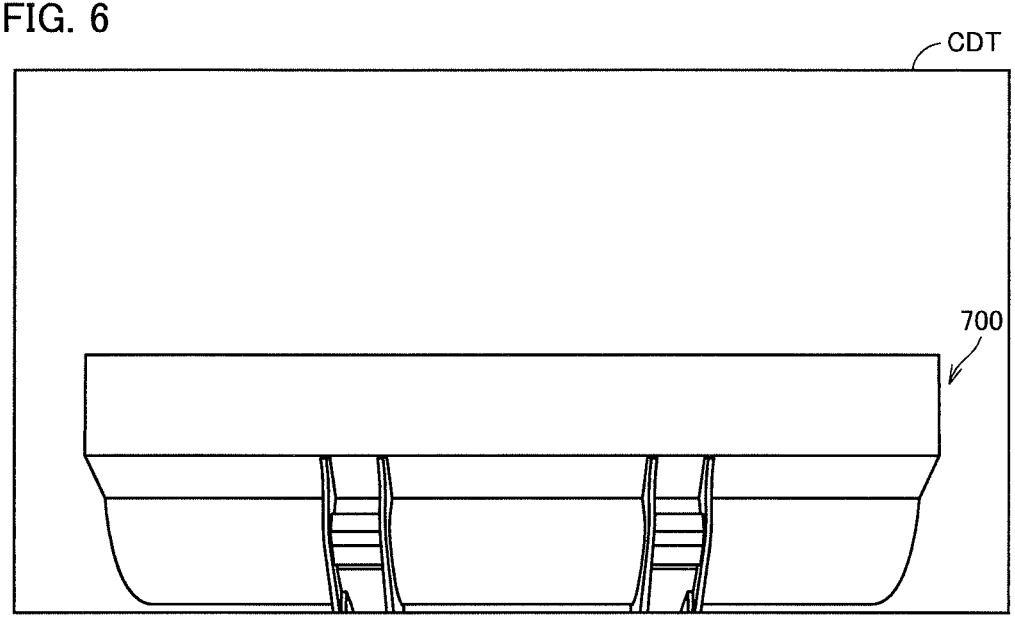
FIG. 6 illustrates image data picked up by a camera 40 based on the first embodiment.

FIG. 6 illustrates image data picked up by camera 40 based on the first embodiment.

FIG. 6 shows image data CDT including bucket 7 of work implement 3 picked up by camera 40. The work implement link connected to bucket 7 is not shown.

Camera 40 is provided above operator's cab 5 and in the rear of work implement 3. Therefore, an image of the inside of bucket 7 of work implement 3 cannot be picked up, because the field of view is blocked by an outer shell of bucket 7 of work implement 3.

In the present example, at least a part of the blocked region where the field of view of the operator from the point of view at the operator's seat of wheel loader 1 shown on display 50 is extracted. Specifically, image analysis unit 103 specifies bucket 7, for example, through pattern matching, based on image data CDT.

Blocked region extraction unit 101 extracts bucket 7 specified by image analysis unit 103 based on image data CDT as a blocked region 700 where the field of view of the operator from the point of view at the operator's seat is blocked.

Figure 7:
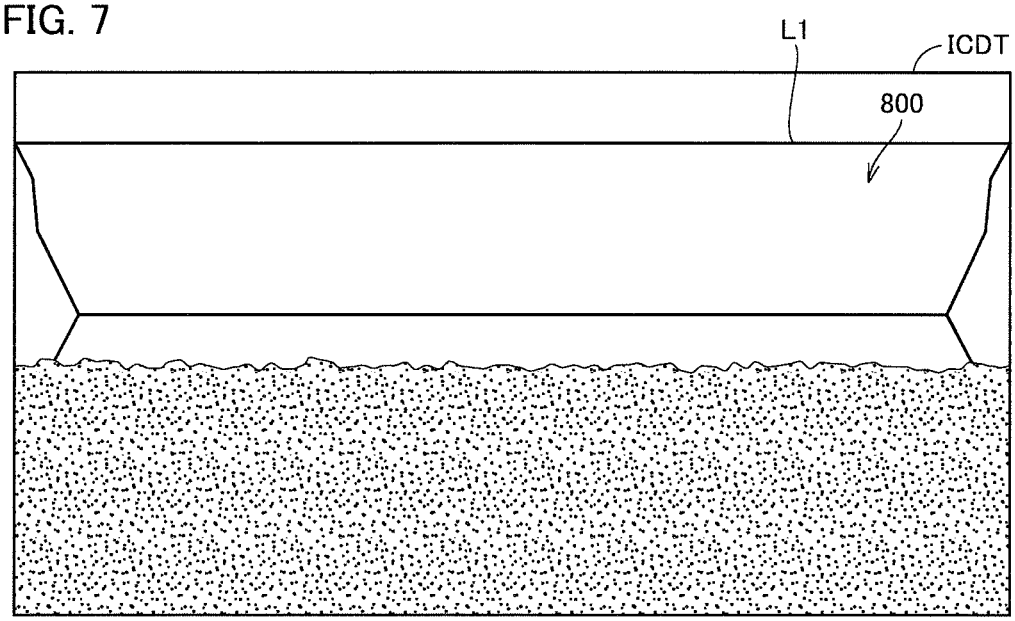
FIG. 7 illustrates image data picked up by a camera 45 based on the first embodiment.

FIG. 7 illustrates image data picked up by camera 45 based on the first embodiment.

FIG. 7 shows image data ICDT including an image of the inside of bucket 7 of work implement 3 picked up by camera 45. Loaded object X is held in the inside of bucket 7.

In the present example, image extraction unit 104 extracts a perspective image 800 on the line of sight of the operator beyond the blocked region extracted by blocked region extraction unit 101 based on image data ICDT. Image extraction unit 104 extracts an image of a prescribed region included in image data ICDT as perspective image 800. Perspective image 800 is extracted based on a contour line L1 of bucket 7. Perspective image 800 is an image on the line of sight of the operator beyond the blocked region where the field of view is blocked by the outer shell of bucket 7.

Figure 8:
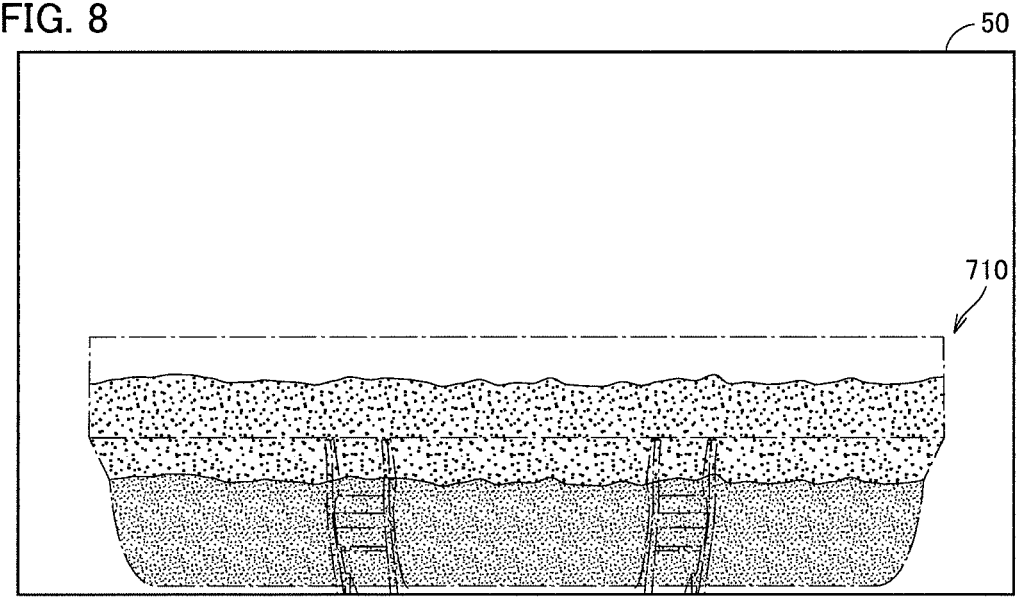
FIG. 8 illustrates a bucket shown on a display 50 based on the first embodiment.

FIG. 8 illustrates the bucket shown on display 50 based on the first embodiment.

As shown in FIG. 8, a perspective image of the inside of bucket 7 is shown as being synthesized.

Control unit 10 based on the first embodiment has display 50 show the contour line of bucket 7 of work implement 3 as being synthesized with the perspective image. In the present example, control unit 10 has display 50 show the contour line of bucket 7 of work implement 3 from the point of view at the operator's seat as being synthesized with the perspective image.

Specifically, image edition unit 106 edits perspective image 800 so as to be in conformity with a shape of a region within the contour line of blocked region 700 extracted by blocked region extraction unit 101, with the contour line being defined as the boundary.

Representation control unit 105 synthesizes the perspective image of the inside of bucket 7 edited by image edition unit 106 with the blocked region where the field of view of the operator from the point of view at the operator's seat of wheel loader 1 on display 50 is blocked, with the contour line of the blocked region being defined as the boundary. Since the perspective image is synthesized with the region within the contour line of the blocked region with the contour line being defined as the boundary, what is called skeletal image representation in which an inner region is seen through while the contour line remains is provided.

In the present example, image extraction unit 104 extracts an image of a prescribed region included in image data ICDT as a perspective image and image edition unit 106 edits the perspective image so as to be in conformity with a shape of a region within the contour line of the blocked region for synthesis of the perspective image with the blocked region. Image extraction unit 104 may extract a perspective image so as to be in conformity with a shape of a region within the contour line of the blocked region. In this case, image edition processing in image edition unit 106 is not performed.

With representation on display 50, a perspective image on the line of sight of the operator beyond the blocked region where the field of view of the operator from the point of view at the operator's seat of the wheel loader on display 50 is blocked can be shown.

In the present example, an image 710 resulting from synthesis of perspective image 800 with blocked region 700 in the inside of bucket 7 in which the field of view of the operator from the point of view at the operator's seat is blocked by the outer shell of bucket 7 is shown, so that a region where the field of view of the operator from the point of view at the operator's seat is blocked is shown and hence a state in bucket 7 can readily be known.

Therefore, the operator can intuitively operate bucket 7 of work implement 3 and work efficiency can be improved. The skeletal contour line is shown with a chain dotted line.

Figure 9:
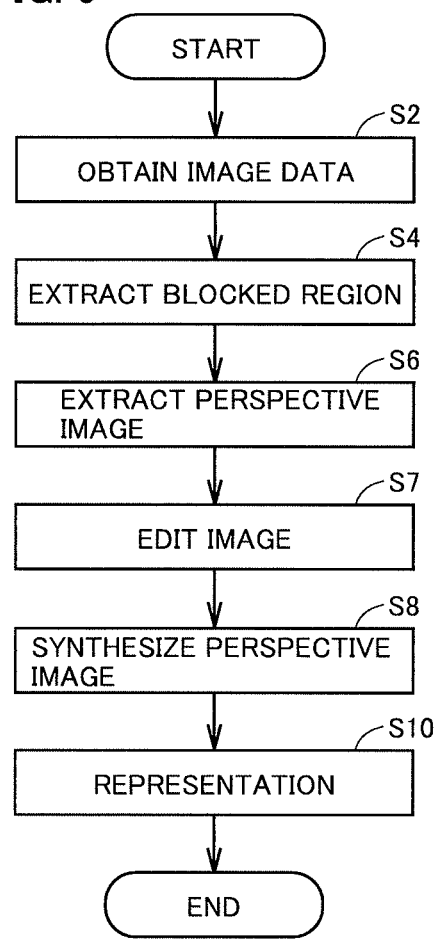
FIG. 9 is a flowchart illustrating processing relating to synthesized representation of a perspective image based on the first embodiment.

FIG. 9 is a flowchart illustrating processing relating to synthesized representation of a perspective image based on the first embodiment.

As shown in FIG. 9, initially, control unit 10 obtains image data (step S2). Image data obtaining unit 102 obtains image data picked up by camera 40 and camera 45.

Control unit 10 extracts a blocked region (step S4). Blocked region extraction unit 101 extracts at least a part of the blocked region where a field of view of an operator from a point of view at the operator's seat of wheel loader 1 on display 50 is blocked by work implement 3 or loaded vehicle 140. For example, image analysis unit 103 specifies bucket 7 included in image data CDT obtained by camera 40. Blocked region extraction unit 101 extracts the specified bucket as blocked region 700. In the present example, by way of example, bucket 7 is extracted as blocked region 700.

Control unit 10 extracts a perspective image (step S6). Image extraction unit 104 extracts as a perspective image, an image of a prescribed region based on image data ICDT obtained by camera 45 and obtained by image data obtaining unit 102. The perspective image is an image in which at least a part of work implement 3 or vessel 160 of loaded vehicle 140 is seen through, and it is an image on the line of sight of the operator beyond the blocked region. In the present example, an image of the inside of bucket 7 is extracted as perspective image 800.

Control unit 100 edits the image (step S7). Image edition unit 106 edits perspective image 800 extracted by image extraction unit 104. Specifically, the perspective image is edited so as to be in conformity with a shape of a region within the contour line of the blocked region extracted by blocked region extraction unit 101, with the contour line being defined as the boundary.

Control unit 10 synthesizes the perspective image (step S8). Representation control unit 105 synthesizes the perspective image edited by image edition unit 106 with the blocked region of bucket 7 in image data CDT, with the contour line of the blocked region being defined as the boundary.

Control unit 10 has the synthesized perspective image shown (step S10). Representation control unit 105 has display 50 show the perspective image as being synthesized with image data CDT.

Then, the process ends (end).

Though a perspective image is synthesized with a blocked region where a field of view of an operator from a point of view at the operator's seat of the wheel loader is blocked which is viewed from the field of view of the operator from the point of view at the operator's seat in the present example, representation based on another angle can also be provided for support of works. For example, a perspective image may be shown as being synthesized with a blocked region where a field of view is blocked when bucket 7 is laterally viewed (a view from a side or a view from a side surface).

Figure 10:
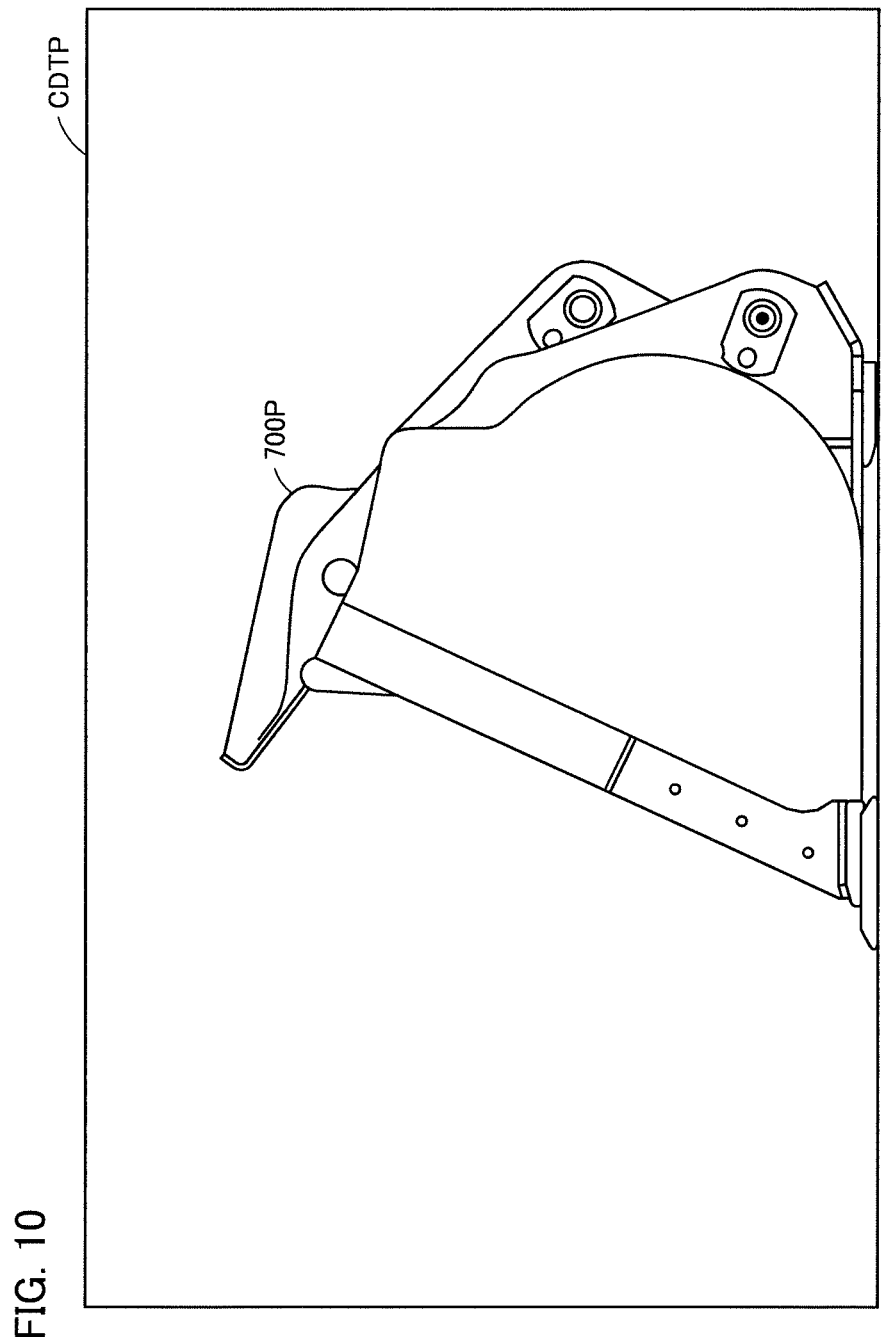
FIG. 10 illustrates image data when a bucket 7 is laterally viewed based on the first embodiment.

FIG. 10 illustrates image data when bucket 7 is laterally viewed based on the first embodiment.

FIG. 10 shows image data CDTP including bucket 7 of work implement 3. The work implement link connected to bucket 7 is not shown. By way of example, image data when bucket 7 is laterally viewed is shown. Actual image data obtained when bucket 7 is actually laterally viewed or model image data when bucket 7 is virtually laterally viewed may be used as image data CDTP. Image data CDTP is stored in a not-shown memory of control unit 10.

Figure 11:
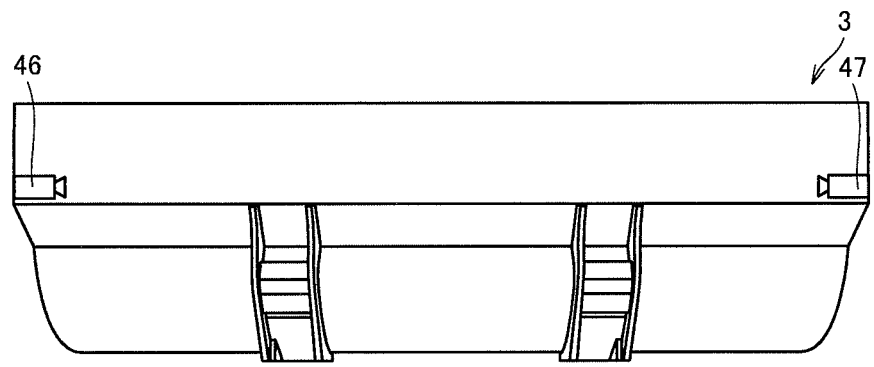
FIG. 11 illustrates cameras 46 and 47 based on the first embodiment.
Figure 11:
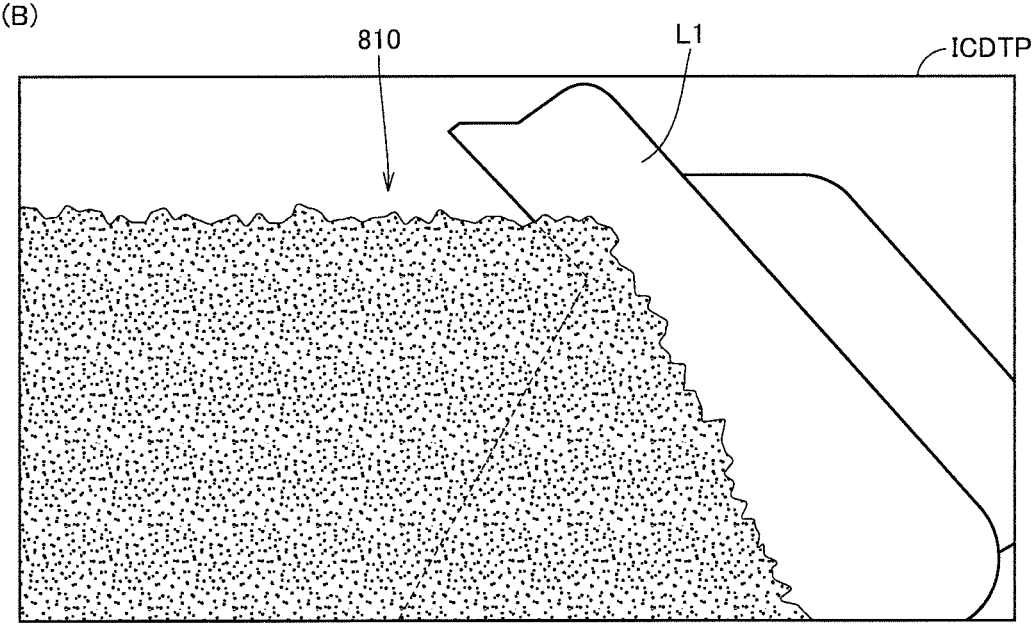

FIG. 11 illustrates cameras 46 and 47 based on the first embodiment.

As shown in FIG. 11 (A), cameras 46 and 47 are attached at positions from which the inside of bucket 7 can laterally be viewed.

FIG. 11 (B) shows image data ICDTP including an image of the inside of bucket 7 of work implement 3 picked up by camera 46.

Camera 46 picks up an image of the inside from a left side of bucket 7. Camera 47 picks up an image of the inside from a right side. With cameras 46 and 47, image data including images of the inside from the left and right of bucket 7 can be obtained and more accurate image data can be obtained as a result of synthesis. Though both of cameras 46 and 47 are provided in the present example, any one of them can also be provided.

In the present example, loaded object X is held in the inside of bucket 7.

For the sake of brevity of description, cameras 45, 46, and 47 are arranged to protrude from the inside of bucket 7, however, holes may be provided in constituent members of bucket 7 and cameras 45, 46, and 47 may be inserted and fixed therein. An extent of protrusion inside the bucket can thus be suppressed. Though cameras 46 and 47 pick up images of the inside of the bucket from sides of bucket 7, holes may be provided diagonally at left and right end portions of a back plate of bucket 7 and cameras 46 and 47 may be inserted and fixed in the holes so as to diagonally pick up images of side surfaces in the inside of the bucket. An extent of protrusion of rear portions of cameras 46 and 47 from the side surfaces of bucket 7 can thus be suppressed.

Camera 40 is provided above operator's cab 5 and in the rear of work implement 3. Therefore, in excavation of loaded object X, an image of the inside of bucket 7 of work implement 3 cannot be picked up because the outer shell blocks also a view of the side surface of bucket 7 of work implement 3.

In the present example, at least a part of a blocked region where the field of view of the operator from the point of view at the operator's seat of wheel loader 1 shown on display 50 is extracted. Specifically, image analysis unit 103 specifies bucket 7, for example, through pattern matching based on image data CDTP. In the present example, laterally viewed bucket 7 is specified.

Blocked region extraction unit 101 extracts bucket 7 specified by image analysis unit 103 based on image data CDTP as a blocked region 700P where the field of view of the operator is blocked.

In the present example, image extraction unit 104 extracts a perspective image on the line of sight of the operator beyond the blocked region extracted by blocked region extraction unit 101 based on image data ICDTP including an image of the inside of bucket 7 of work implement 3 picked up by camera 45 described with reference to FIG. 11 (B).

By way of example, image extraction unit 104 extracts an image of a prescribed region included in image data ICDTP as a perspective image 810. The perspective image is an image on the line of sight of the operator beyond the blocked region where the field of view is blocked in the side view by the outer shell of the side surface of bucket 7.

Figure 12:
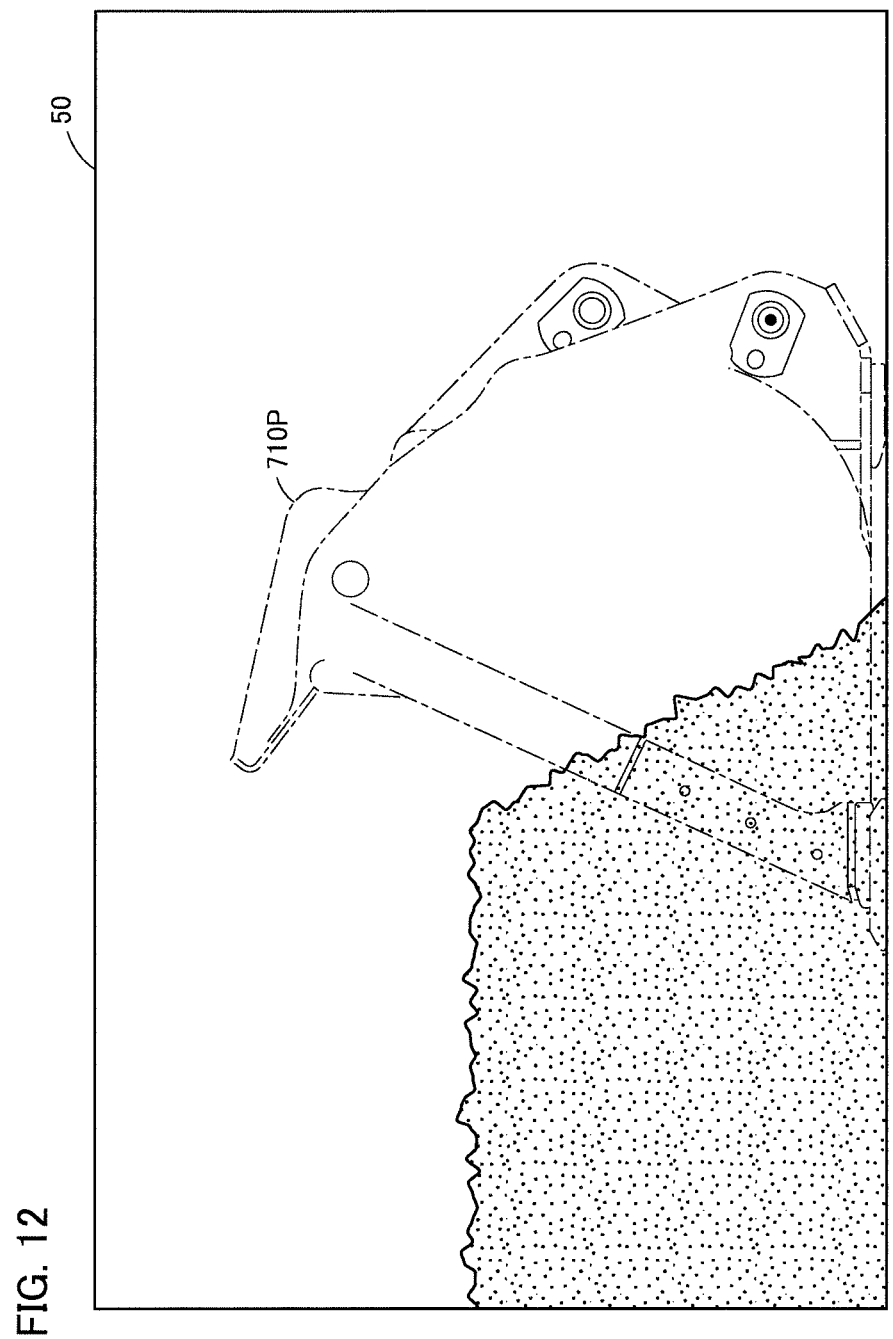
FIG. 12 illustrates a bucket shown on display 50 from another angle based on the first embodiment.

FIG. 12 illustrates the bucket shown on display 50 based on the first embodiment.

As shown in FIG. 12, the perspective image of the inside of laterally viewed bucket 7 is shown as being synthesized.

Control unit 10 based on the first embodiment has display 50 show the contour line of laterally viewed bucket 7 of work implement 3 as being synthesized with the perspective image. In the present example, control unit 10 has display 50 show the contour line of viewed laterally bucket 7 of work implement 3 as being synthesized with the perspective image.

Specifically, image edition unit 106 edits perspective image 810 so as to be in conformity with a shape of a region within the contour line of blocked region 700P extracted by blocked region extraction unit 101, with the contour line being defined as the boundary.

Representation control unit 105 has display 50 show perspective image 810 of the inside of bucket 7 edited by image edition unit 106 as being synthesized with the blocked region where the field of view of the operator of wheel loader 1 on display 50 is blocked, with the contour line of the blocked region being defined as the boundary. Since the perspective image is synthesized with the region within the contour line of the blocked region with the contour line being defined as the boundary, what is called skeletal image representation in which an inner region is seen through while the contour line remains is provided.

In the present example, since the region where the field of view of the operator is blocked is shown by showing an image 710P resulting from synthesis of the perspective image with blocked region 700P in the inside of bucket 7 where the field of view of the operator is blocked by the outer shell of the side surface of bucket 7, a state of the inside of bucket 7 from a lateral direction can readily be known.

Therefore, the operator can intuitively operate bucket 7 of work implement 3 and work efficiency can be improved. The skeletal contour line is shown with a chain dotted line.

Image data picked up by camera 45 is employed as an image of the inside of bucket 7 in the present example. When a condition in the inside can be estimated with a perception sensor provided in the inside of bucket 7, however, one of perspective images provided in advance can be selected based on the estimated condition and the selected perspective image can be synthesized. A result of calculation based on the estimated condition can also be synthesized.

Though control unit 10 provided in wheel loader 1 causes the display to show a perspective image in the present example, whole processing can also be performed by a control system in coordination with other apparatuses instead of control unit 10 performing whole processing.

(Modification)

Figure 13:
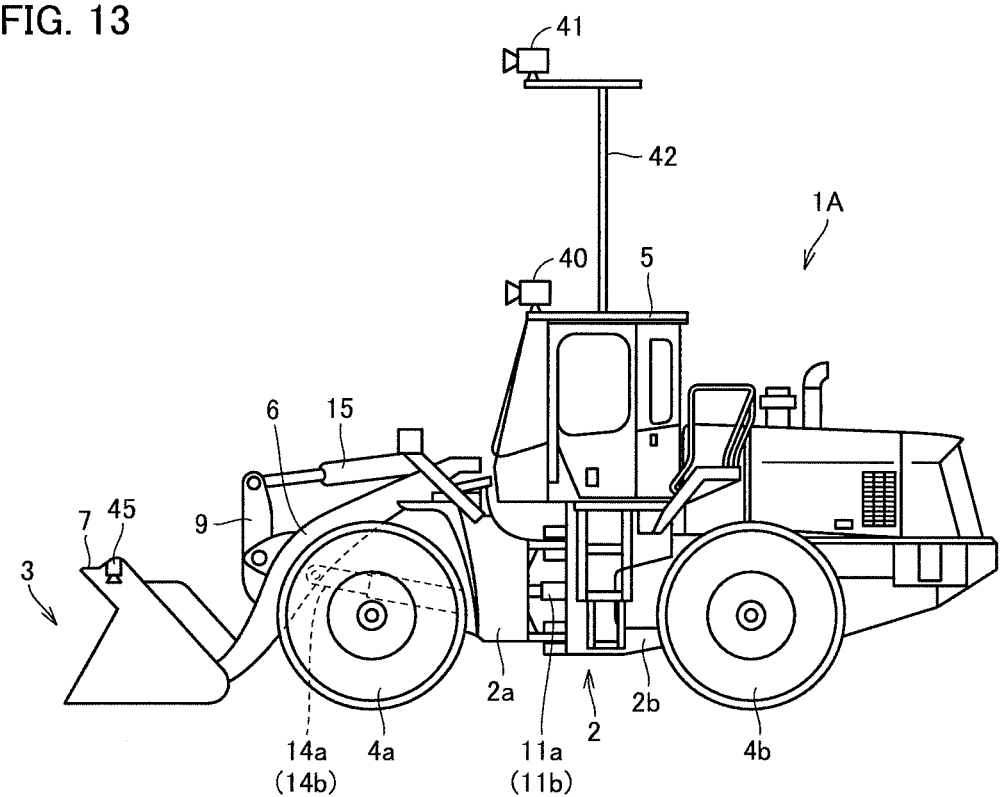
FIG. 13 shows appearance of a wheel loader 1A based on a modification of the first embodiment.

FIG. 13 shows appearance of a wheel loader 1A based on a modification of the first embodiment.

As shown in FIG. 13, wheel loader 1A is different from wheel loader 1 in that a camera 41 provided above camera 40 and a support unit 42 which supports the same are further added. Since the configuration is otherwise the same as described in the first embodiment, detailed description thereof will not be repeated.

Figure 14:
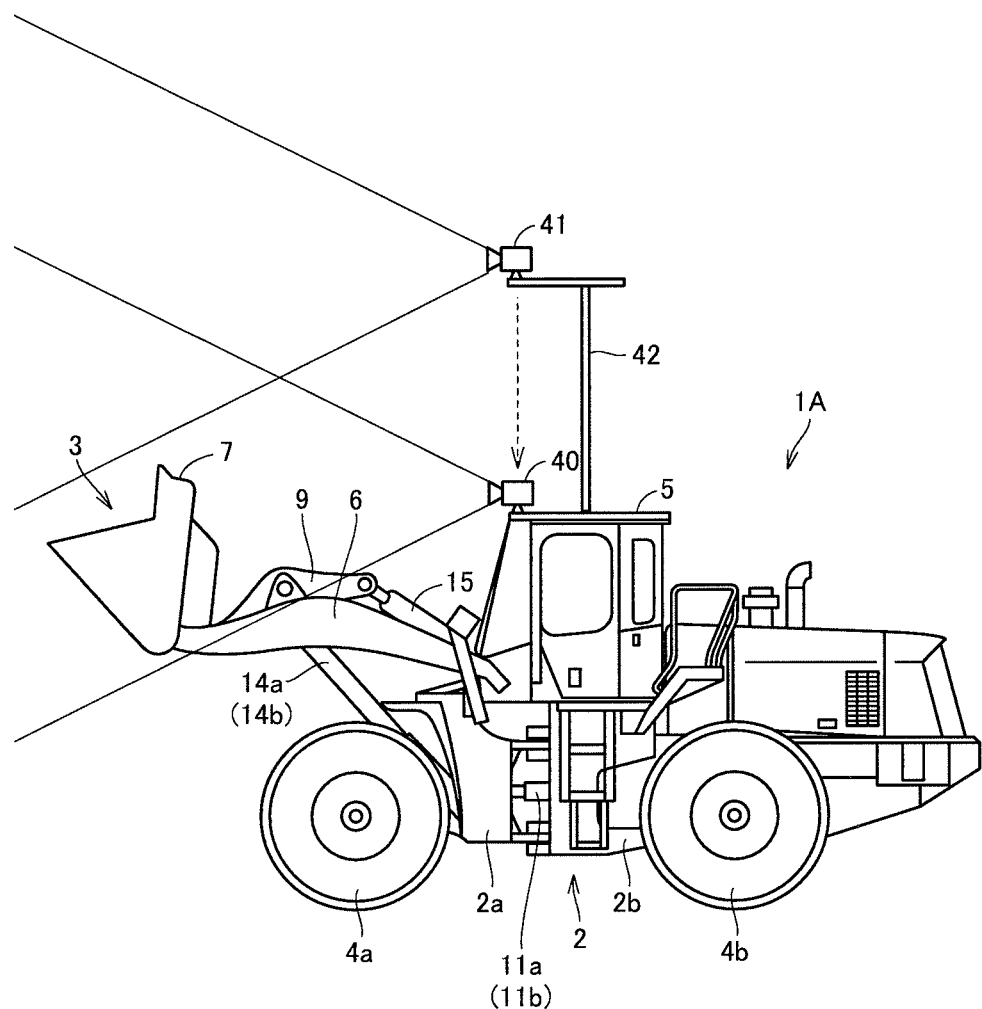
FIG. 14 illustrates ranges of image pick-up by camera 40 and camera 41 based on the modification of the first embodiment.

FIG. 14 illustrates ranges of image pick-up by camera 40 and camera 41 based on the modification of the first embodiment.

As shown in FIG. 14, an image pick-up range of camera 40 includes a state of work by work implement 3. Therefore, in showing image data picked up by camera 40 on display 50, a blocked region where a field of view of an operator from a point of view at the operator's seat of the wheel loader on display 50 is blocked is produced.

Camera 41 is provided at a position above camera 40 and an image pick-up range of camera 41 is set not to include work implement 3 regardless of a state of work by work implement 3. In the present example, a perspective image on the line of sight of the operator beyond the blocked region can be obtained based on image data picked up by camera 41.

Figure 15:
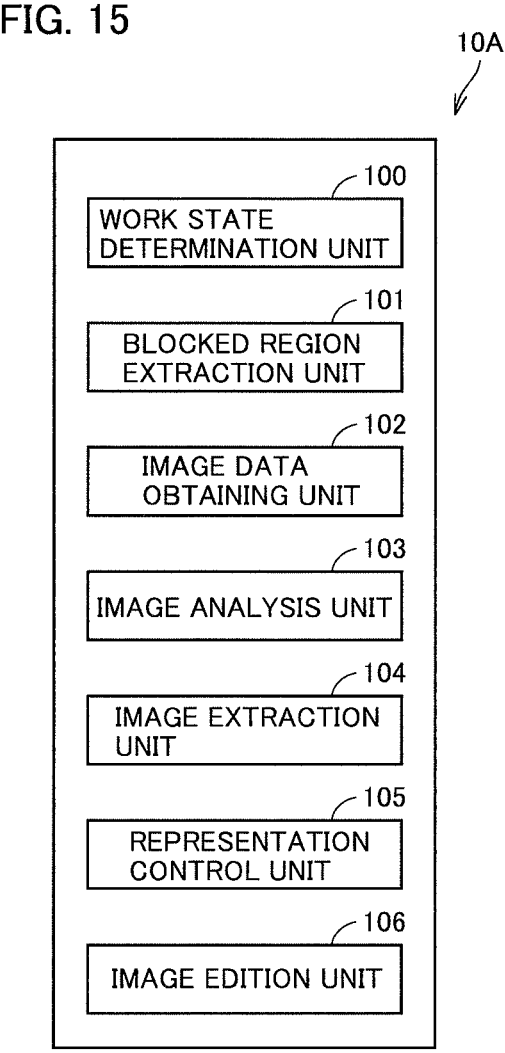
FIG. 15 illustrates a functional block of a control unit 10A of wheel loader 1A based on the modification of the first embodiment.

FIG. 15 illustrates a functional block of a control unit 10A of wheel loader 1A based on the modification of the first embodiment.

As shown in FIG. 15, control unit 10A implements a functional block by executing various programs stored in memory 60.

Control unit 10A has display 50 show a perspective image in which at least a part of work implement 3 of wheel loader 1 or vessel 160 of loaded vehicle 140 is seen through.

Specifically, control unit 10A is different from control unit 10 in that a work state determination unit 100 is further added.

Since the configuration is otherwise the same as described with reference to FIG. 5, detailed description thereof will not be repeated.

Work state determination unit 100 determines a state of work by work implement 3 in response to an operation instruction through operation portion 8. For example, a state of work by work implement 3 can be determined based on a height of bucket 7 and an operation instruction for bucket 7. By way of example, a state of the work implement link can be specified and a height with respect to bucket 7 can be calculated based on a length of the lift cylinder of boom 6 and a length of bucket cylinder 15.

Specifically, when a cylinder pressure is equal to or higher than a prescribed pressure in a state of work by work implement 3 in which a height of bucket 7 is lower than a prescribed height, it is determined that an excavation work is performed. By way of example, a bottom pressure of lift cylinder 14 is adopted as the cylinder pressure. In this regard, a value detected by second hydraulic sensor 95 can be made use of.

When a cylinder pressure is equal to or higher than a prescribed pressure, a height of bucket 7 is equal to or higher than a prescribed height, and bucket 7 is not moved or bucket 7 is moved rearward, a state of work by work implement 3 is determined as a loading work. A condition that a cylinder pressure is equal to or higher than a prescribed pressure is set for determining a state that bucket 7 holds soil.

When a cylinder pressure is equal to or higher than a prescribed pressure, a height of bucket 7 is equal to or higher than a prescribed height, and bucket 7 is moved forward, a state of work by work implement 3 is determined as a soil ejection work.

Blocked region extraction unit 101 extracts at least a part of a blocked region where the field of view of the operator from the point of view at the operator's seat of wheel loader 1 on the display is blocked by work implement 3 or loaded vehicle 140 based on a state of work determined by work state determination unit 100.

Figure 16:
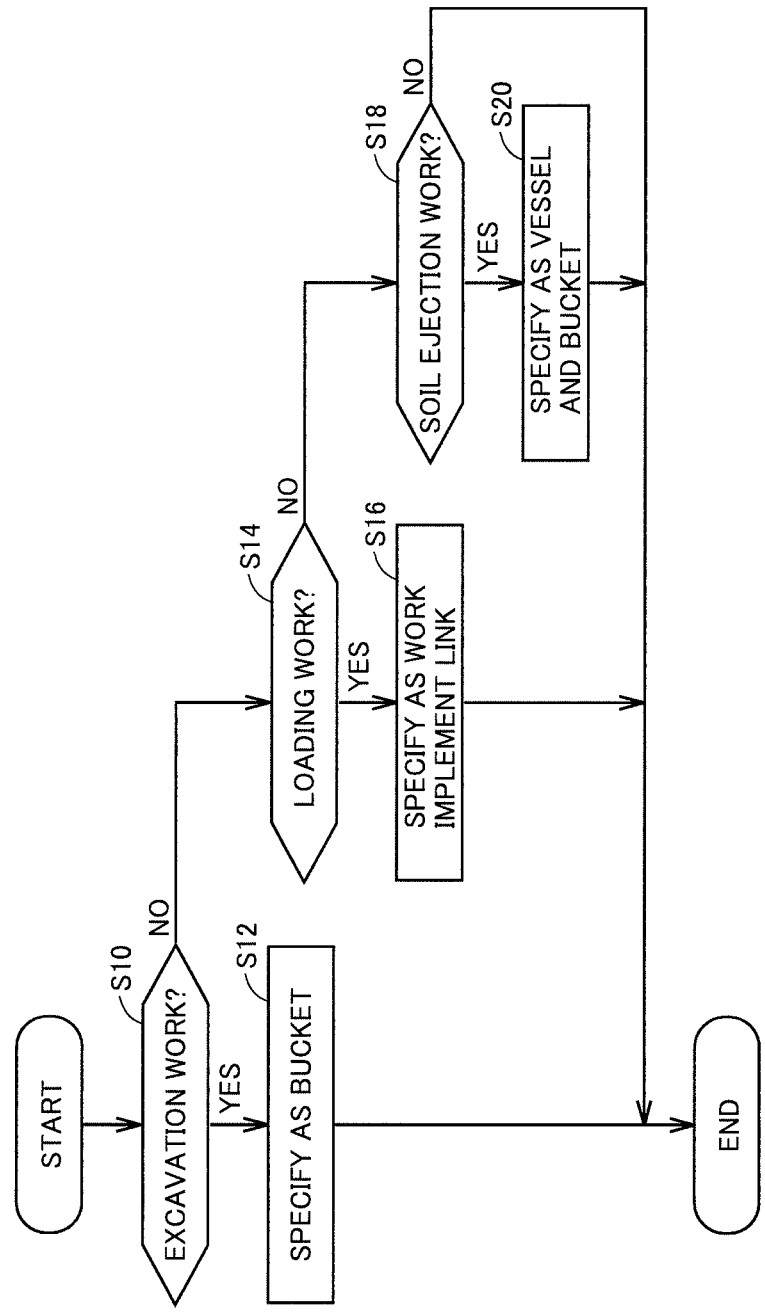
FIG. 16 is a flowchart in which a source from which a blocked region is to be extracted by a blocked region extraction unit 101 based on a work state is specified based on the modification of the first embodiment.

FIG. 16 is a flowchart in which a source from which a blocked region is to be extracted by blocked region extraction unit 101 based on a work state is specified based on the modification of the first embodiment.

As shown in FIG. 16, blocked region extraction unit 101 determines whether or not a work state determined by work state determination unit 100 is an excavation work (step S10).

When blocked region extraction unit 101 determines in step S10 that the work state is the excavation work (YES in step S10), it specifies a source from which the blocked region is to be extracted as the bucket (step S12).

Then, the process ends (end).

When blocked region extraction unit 101 determines in step S10 that the work state is not the excavation work (NO in step S10), it determines whether or not the work state determined by work state determination unit 100 is a loading work (step S14).

When blocked region extraction unit 101 determines in step S14 that the work state is the loading work (YES in step S14), it specifies a source from which the blocked region is to be extracted as the work implement link (step S16).

Then, the process ends (end).

When blocked region extraction unit 101 determines in step S14 that the work state is not the loading work (NO in step S14), it determines whether or not the work state determined by work state determination unit 100 is a soil ejection work (step S18).

When blocked region extraction unit 101 determines in step S18 that the work state is the soil ejection work (YES in step S18), it specifies a source from which the blocked region is to be extracted as the vessel and the bucket (step S20).

Then, the process ends (end).

When blocked region extraction unit 101 determines in step S18 that the work state is not the soil ejection work (NO in step S18), the work state cannot be specified and the process ends (end). Therefore, in this case, the blocked region is not extracted.

According to the above, in the excavation work, blocked region extraction unit 101 extracts bucket 7 as the blocked region. In the loading work, the work implement link is extracted as the blocked region. In the soil ejection work, vessel 160 and bucket 7 are extracted as the blocked region.

Representation during the excavation work is the same as described in the first embodiment.

Specifically, blocked region extraction unit 101 extracts bucket 7 as blocked region 700 where the field of view of the operator from the point of view at the operator's seat is blocked. Image extraction unit 104 extracts perspective image 800 on the line of sight of the operator beyond the blocked region extracted by blocked region extraction unit 101. Image edition unit 106 edits perspective image 800 so as to be in conformity with a shape of a region within the contour line of blocked region 700 extracted by blocked region extraction unit 101, with the contour line being defined as the boundary. Representation control unit 105 has display 50 show the perspective image of the inside of bucket 7 edited by image edition unit 106 as being synthesized with the blocked region where the field of view of the operator from the point of view at the operator's seat of wheel loader 1 on display 50 is blocked, with the contour line of the blocked region being defined as the boundary.

Representation during the loading work will now be described.

Figure 17:
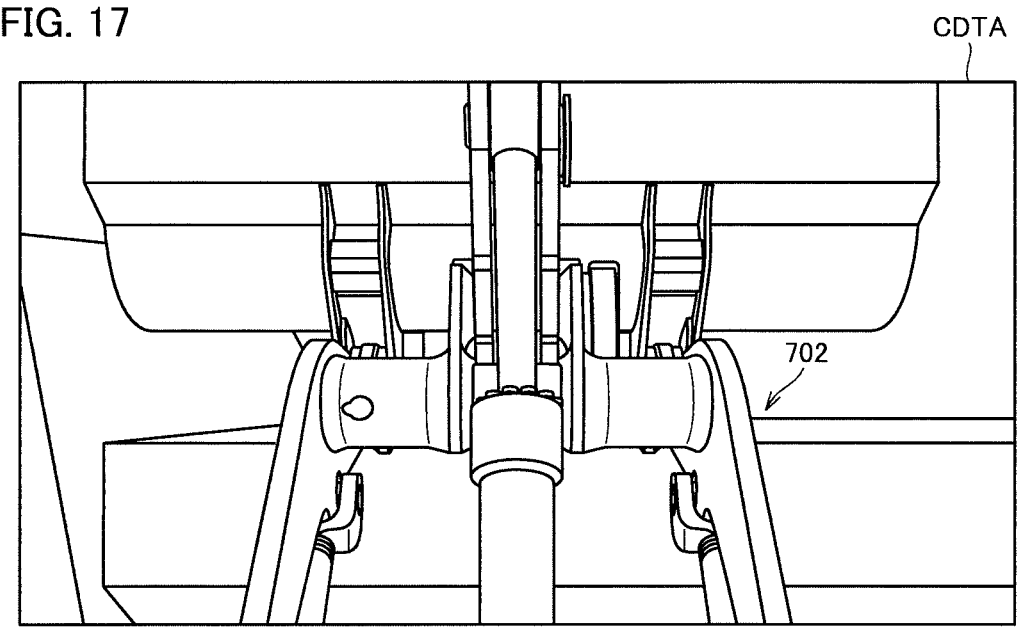
FIG. 17 illustrates image data picked up by camera 40 during a loading work based on the modification of the first embodiment.

FIG. 17 illustrates image data picked up by camera 40 during a loading work based on the modification of the first embodiment.

FIG. 17 shows image data CDTA including the work implement link of work implement 3 picked up by camera 40.

Camera 40 is provided above operator's cab 5 and in the rear of work implement 3. Therefore, the camera cannot pick up an image of a part of vessel 160 located in front of work implement 3 because the work implement link of work implement 3 blocks the field of view.

In the present example, at least a part of the blocked region where the field of view of the operator from the point of view at the operator's seat of wheel loader 1 shown on display 50 is blocked is extracted. Specifically, image analysis unit 103 specifies the work implement link, for example, through pattern matching based on image data CDTA.

Blocked region extraction unit 101 extracts the work implement link specified by image analysis unit 103 based on image data CDTA as a blocked region 702 where the field of view of the operator from the point of view at the operator's seat is blocked.

Figure 18:
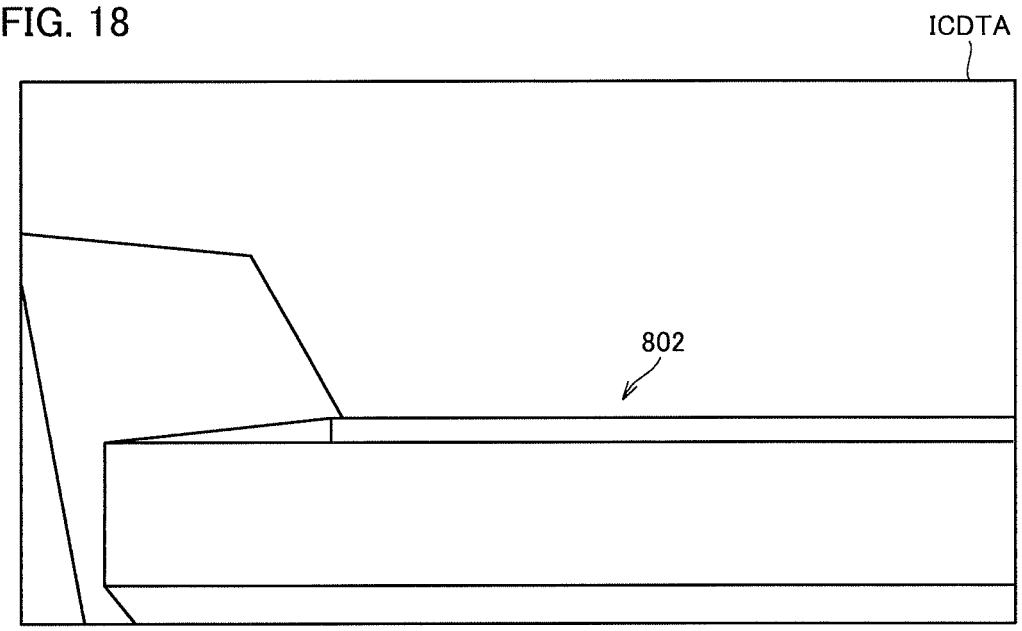
FIG. 18 illustrates image data picked up by camera 41 during the loading work based on the modification of the first embodiment.

FIG. 18 illustrates image data picked up by camera 41 during the loading work based on the modification of the first embodiment.

FIG. 18 shows image data ICDTA including vessel 160 of loaded vehicle 140 resulting from image pick-up by camera 41.

An image pick-up range of camera 41 is set not to include work implement 3 regardless of a work state of work implement 3. In the present example, since cameras 40 and 41 are different from each other in position of the point of view, an image pick-up range subjected to image conversion processing such that camera 41 and camera 40 are identical in position of point of view is shown.

In the present example, image extraction unit 104 extracts a perspective image 802 on the line of sight of the operator beyond blocked region 702 extracted by blocked region extraction unit 101 based on image data ICDTA. Image extraction unit 104 extracts perspective image 802 included in image data based on a contour line L2 of the work implement link. Perspective image 802 is an image on the line of sight of the operator beyond the blocked region where the work implement link blocks the field of view.

Figure 19:
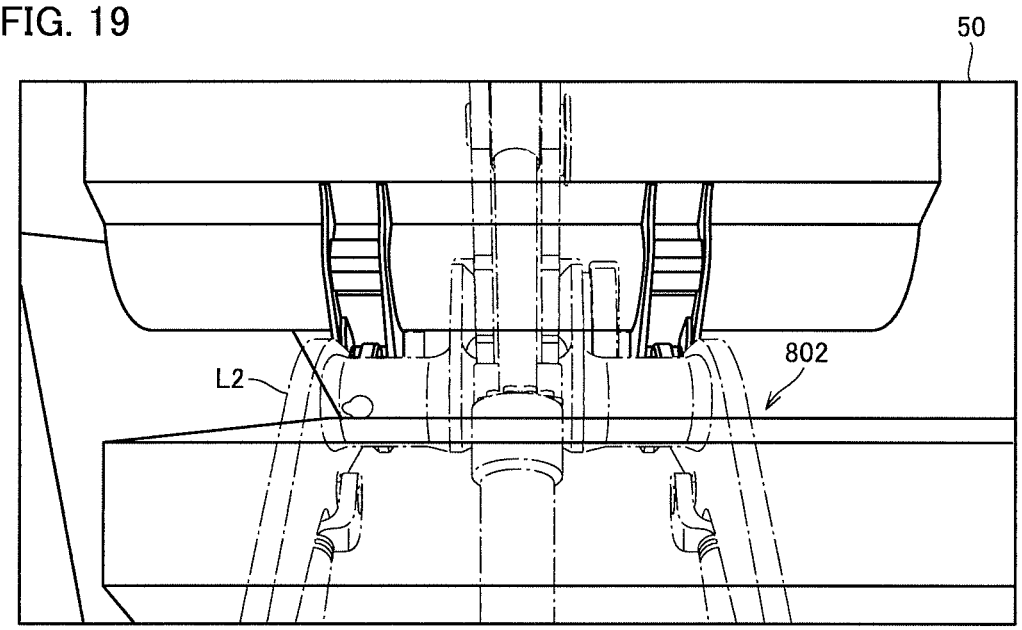
FIG. 19 illustrates an image shown on display 50 during the loading work based on the modification of the first embodiment.

FIG. 19 illustrates an image shown on display 50 during the loading work based on the modification of the first embodiment.

FIG. 19 shows perspective image 802 extracted by image extraction unit 104 as being synthesized.

Control unit 10A based on the modification of the first embodiment has display 50 show the contour line of the work implement link of work implement 3 as being synthesized with the perspective image. In the present example, control unit 10A has display 50 show the contour line of the work implement link of work implement 3 from the point of view at the operator's seat as being synthesized with the perspective image.

Specifically, image edition unit 106 edits perspective image 802 so as to be in conformity with a shape of a region within the contour line of blocked region 702 extracted by blocked region extraction unit 101, with the contour line being defined as the boundary.

Representation control unit 105 has display 50 show the perspective image edited by image edition unit 106 as being synthesized with the blocked region where the field of view of the operator from the point of view at the operator's seat of wheel loader 1 on display 50 is blocked, with the contour line of the blocked region being defined as the boundary.

Since the perspective image is synthesized with the region within the contour line of the blocked region with the contour line being defined as the boundary, what is called skeletal image representation in which an inner region is seen through while the contour line remains is provided.

In the present example, image extraction unit 104 extracts perspective image 802 based on contour line L2 of the work implement link included in image data ICDTA and image edition unit 106 edits the perspective image so as to be in conformity with a shape of a region within the contour line of the blocked region for synthesis of the perspective image with the blocked region. Image extraction unit 104 may extract a perspective image so as to be in conformity with a shape of a region within the contour line of the blocked region. In this case, image edition processing by image edition unit 106 is not performed.

With representation on display 50, a perspective image on the line of sight of the operator beyond the blocked region where the field of view of the operator from the point of view at the operator's seat of the wheel loader on display 50 is blocked can be shown.

In the present example, a perspective image of a part of vessel 160 of which view from the operator from the point of view at the operator's seat is blocked by the work implement link is shown as being synthesized with the work implement link, so that a region where the field of view of the operator is blocked is shown and hence a state of vessel 160 can readily be known. Therefore, the operator can intuitively operate work implement 3 in a work of loading on vessel 160 and work efficiency can be improved.

Representation during a soil ejection work will now be described.

Figure 20:
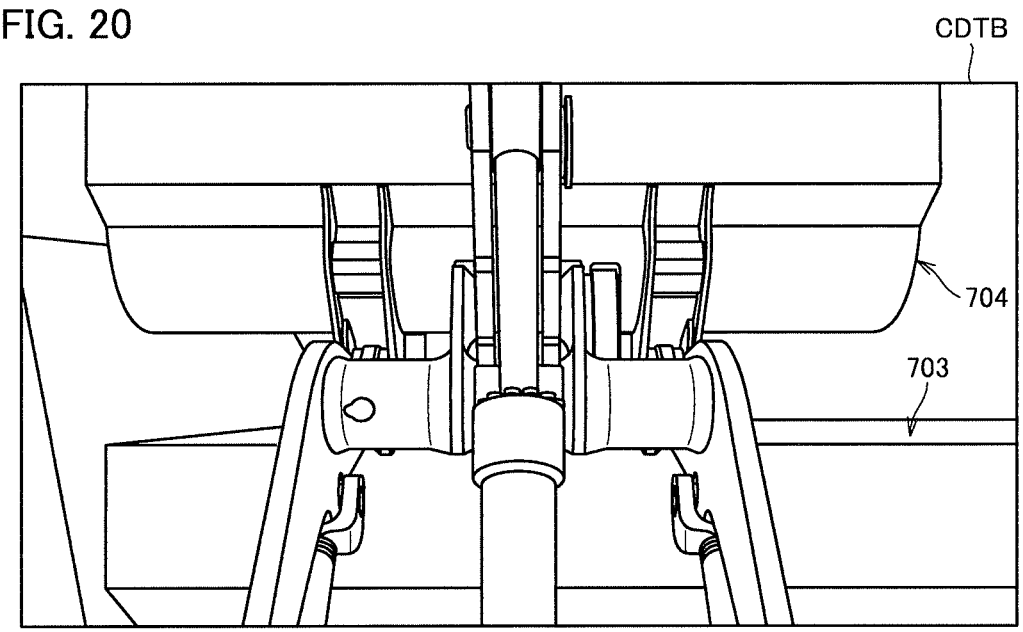
FIG. 20 illustrates image data picked by camera 40 during a soil ejection work based on the modification of the first embodiment.

FIG. 20 illustrates image data picked by camera 40 during a soil ejection work based on the modification of the first embodiment.

FIG. 20 shows image data CDTB including the bucket of work implement 3 and vessel 160 of loaded vehicle 140 resulting from image pick-up by camera 40.

Camera 40 is provided above operator's cab 5 and in the rear of work implement 3. Therefore, the camera cannot pick up an image of the inside of vessel 160 of loaded vehicle 140 because an outer shell of vessel 160 blocks the field of view. An image of the inside of bucket 7 of work implement 3 cannot be picked up because the outer shell of bucket 7 of work implement 3 blocks the field of view.

In the present example, at least a part of a blocked region where the field of view of the operator from the point of view at the operator's seat of wheel loader 1 shown on display 50 is blocked is extracted. Specifically, image analysis unit 103 specifies vessel 160 and bucket 7, for example, through pattern matching based on image data CDTB.

Blocked region extraction unit 101 extracts the vessel specified by image analysis unit 103 based on image data CDTB as a blocked region 703 where the field of view of the operator from the point of view at the operator's seat is blocked. Blocked region extraction unit 101 extracts the bucket specified by image analysis unit 103 based on image data CDTB as a blocked region 704 where the field of view of the operator from the point of view at the operator's seat is blocked.

Figure 21:
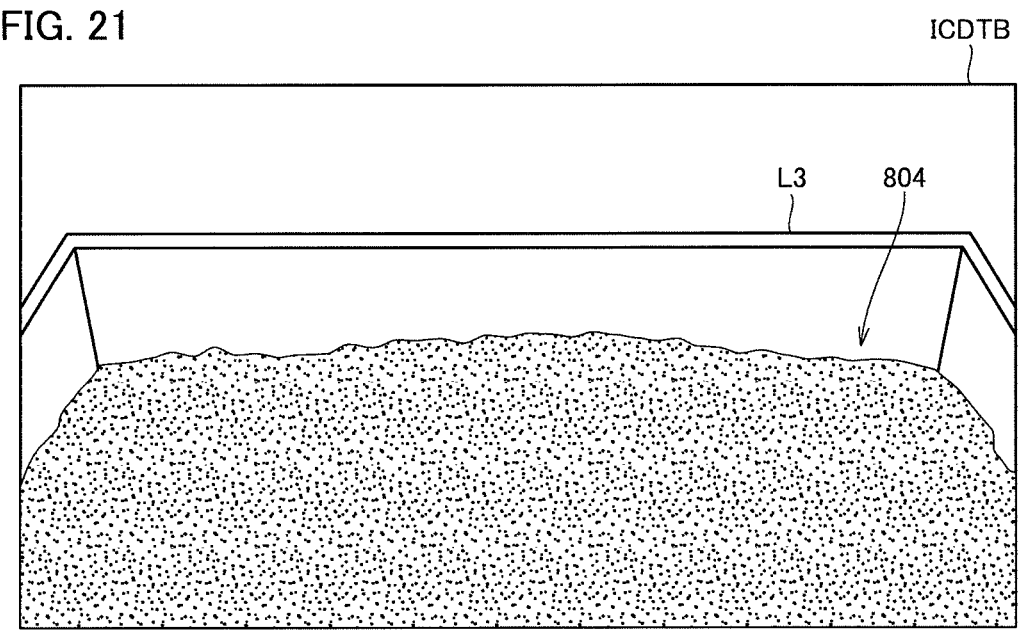
FIG. 21 illustrates image data picked up by a camera 151 during the soil ejection work based on the modification of the first embodiment.

FIG. 21 illustrates image data picked up by camera 151 during a soil ejection work based on the modification of the first embodiment.

FIG. 21 shows image data ICDTB including an image of the inside of vessel 160 of loaded vehicle 140 resulting from image pick-up by camera 151. Loaded object X is held in vessel 160.

Image data ICDB picked up by camera 151 is transmitted to wheel loader 1 through communication device 134. Image data obtaining unit 102 of wheel loader 1 obtains image data ICDB through communication unit 19.

In the present example, image extraction unit 104 extracts a perspective image 804 on the line of sight of the operator beyond the blocked region extracted by blocked region extraction unit 101 based on image data ICDTB. Image extraction unit 104 extracts an image of a prescribed region included in image data ICDTB as perspective image 804. Perspective image 804 is extracted based on a contour line L3 of vessel 160. Perspective image 804 is an image on the line of sight of the operator beyond the blocked region where the outer shell of vessel 160 blocks the field of view.

Figure 22:
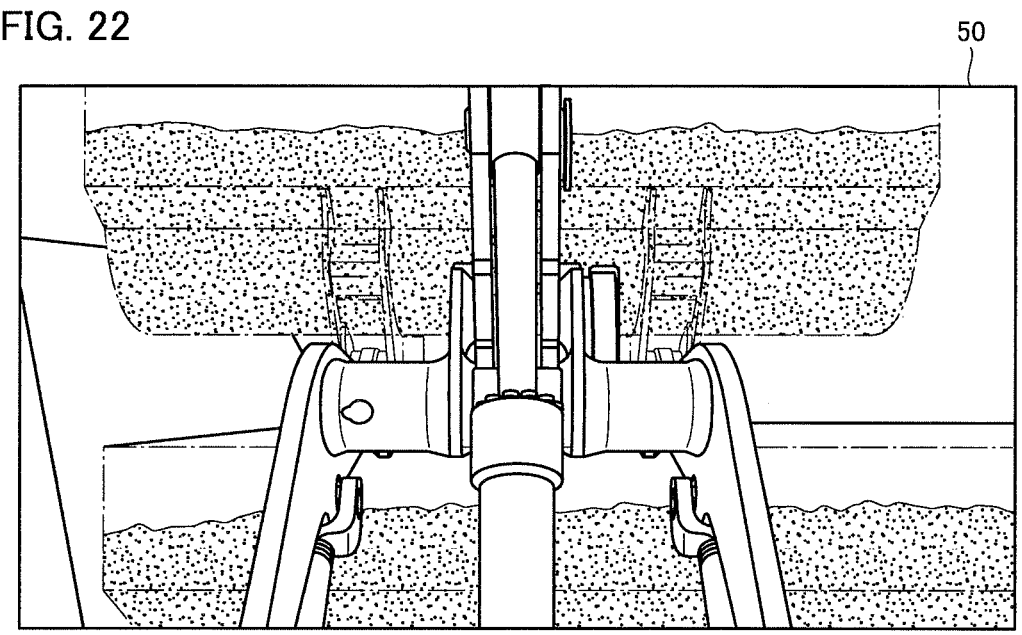
FIG. 22 illustrates an image shown on display 50 during the soil ejection work based on the modification of the first embodiment.

FIG. 22 illustrates an image shown on display 50 during the soil ejection work based on the modification of the first embodiment.

FIG. 22 shows a perspective image of the inside of vessel 160 as being synthesized.

Control unit 10A based on the modification of the first embodiment has display 50 show the contour line of vessel 160 of loaded vehicle 140 as being synthesized with the perspective image. In the present example, control unit 10A has display 50 show the contour line of vessel 160 from the point of view at the operator's seat as being synthesized with the perspective image.

Specifically, image edition unit 106 edits perspective image 804 so as to be in conformity with a shape of a region within the contour line of blocked region 703 extracted by blocked region extraction unit 101, with the contour line being defined as the boundary.

Representation control unit 105 has display 50 show the perspective image edited by image edition unit 106 as being synthesized with the blocked region where the field of view of the operator from the point of view at the operator's seat of wheel loader 1 on display 50 is blocked, with the contour line of the blocked region being defined as the boundary. Since the perspective image is synthesized with the region within the contour line of the blocked region with the contour line being defined as the boundary, what is called skeletal image representation in which an inner region is seen through while the contour line remains is provided.

In the present example, image extraction unit 104 extracts an image of a prescribed region included in image data ICDTB as perspective image 804 and image edition unit 106 edits the perspective image so as to be in conformity with a shape of a region within the contour line of the blocked region for synthesis of the perspective image with the blocked region. Image extraction unit 104 may extract a perspective image so as to be in conformity with a shape of a region within the contour line of the blocked region. In this case, image edition processing in image edition unit 106 is not performed.

In the present example, not only vessel 160 but also bucket 7 are shown as being skeletal.

Image extraction unit 104 extracts the perspective image on the line of sight of the operator beyond blocked region 704 extracted by blocked region extraction unit 101 based on image data ICDTB. As described in the first embodiment, the perspective image is extracted based on image data including an image of the inside of bucket 7 of work implement 3 resulting from image pick-up by camera 45.

Image edition unit 106 edits the perspective image so as to be in conformity with a shape of a region within the contour line of blocked region 704 extracted by blocked region extraction unit 101, with the contour line being defined as the boundary.

Representation control unit 105 has display 50 show the perspective image of the inside of bucket 7 edited by image edition unit 106 as being synthesized with the blocked region where the field of view of the operator from the point of view at the operator's seat of wheel loader 1 on display 50 is blocked, with the contour line of the blocked region being defined as the boundary. Since the perspective image is synthesized with the region within the contour line of the blocked region with the contour line being defined as the boundary, what is called skeletal image representation in which an inner region is seen through while the contour line remains is provided.

With representation on display 50, a perspective image on the line of sight of the operator beyond the blocked region where the field of view of the operator from the point of view at the operator's seat of the wheel loader on display 50 is blocked can be shown.

In the present example, a perspective image of the inside of vessel 160 of which view of the operator from the point of view at the operator's seat is blocked by the outer shell of vessel 160 is shown as being synthesized with vessel 160, so that a region where the field of view of the operator from the point of view at the operator's seat is blocked is shown and hence a state of the inside of vessel 160 can readily be known. In the present example, a perspective image of the inside of bucket 7 of which view of the operator from the point of view at the operator's seat is blocked by the outer shell of bucket 7 is shown as being synthesized with bucket 7, so that a region where the field of view of the operator from the point of view at the operator's seat is blocked is shown and hence a state of the inside of bucket 7 can readily be known.

The operator can intuitively operate work implement 3 in the work for soil ejection by work implement 3 into vessel 160 and work efficiency can be improved.

Image data picked up by camera 151 is employed as an image of the inside of vessel 160 in the present example. When a condition in the inside can be estimated with a perception sensor provided in the inside of vessel 160, however, one of perspective images provided in advance can be selected based on the estimated condition and the selected perspective image can be synthesized. A result of calculation based on the estimated condition can also be synthesized.

Though vessel 160 and bucket 7 are defined as the blocked region in the present example, the work implement link may also be shown as the blocked region as being skeletal.

For supporting works, an image may be shown as being further processed. Specifically, control unit 10 may specify a site where interference between the work implement link and vessel 160 is likely and have the site shown as being highlighted. For example, representation control unit 105 may provide highlighted representation by coloring a site where interference is likely and changing the color. Depending on possibility of interference, the color can also be changed. For example, when the possibility is low, a light red color may be set, and as the possibility is higher, change to a darker red color may be made. The possibility of interference can be determined based on a distance between them.

Image analysis unit 103 can calculate a distance between vessel 160 and wheel loader 1 included in image data CDTB. A state of work implement link 3 can be specified based on a length of the lift cylinder of boom 6 and a length of bucket cylinder 15 by way of example. Representation control unit 105 can calculate a distance between them based on positional relation based on a result of such calculation and provide highlighted representation.

(Second Embodiment)

In the first embodiment and the modification thereof, blocked region extraction unit 101 extracts at least a part of a blocked region where the field of view of the operator from the point of view at the operator's seat of wheel loader 1 on the display is blocked by work implement 3 or loaded vehicle 140. Specifically, a prescribed region included in image data resulting from image pick-up is specified through pattern matching and extracted as a blocked region.

Extraction of a blocked region with another scheme will be described in a second embodiment.

Figure 23:
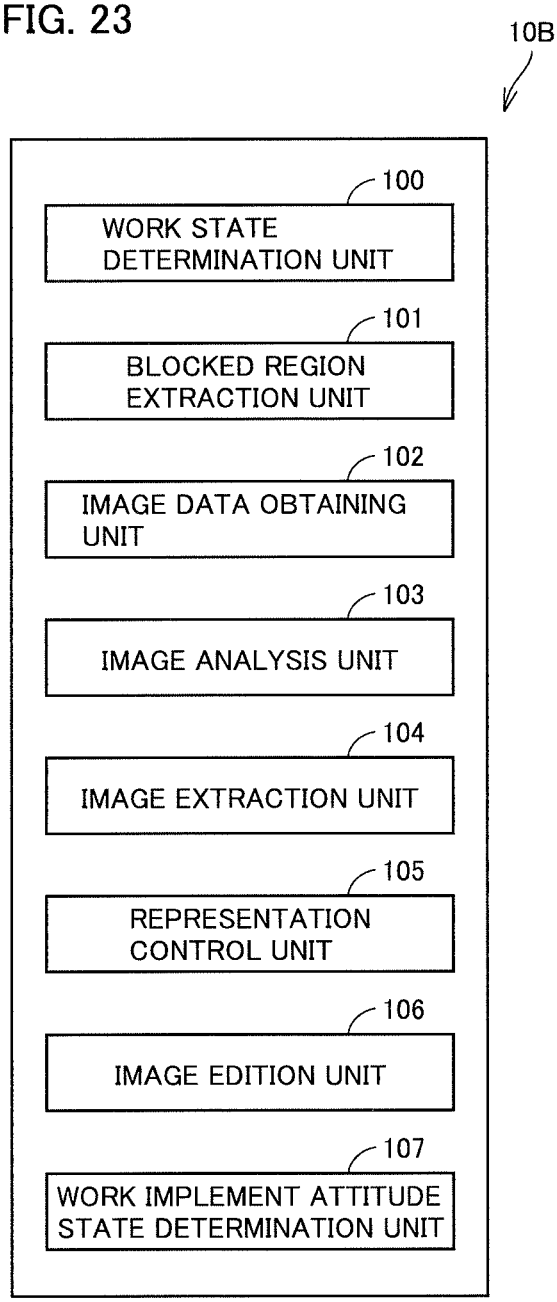
FIG. 23 illustrates a functional block of a control unit 10B of wheel loader 1 based on a second embodiment.

FIG. 23 illustrates a functional block of a control unit 10B of wheel loader 1 based on the second embodiment.

As shown in FIG. 23, control unit 10B implements a functional block by executing various programs stored in memory 60.

Control unit 10B has display 50 show a perspective image in which at least a part of work implement 3 of wheel loader 1 or vessel 160 of loaded vehicle 140 is seen through.

Specifically, control unit 10B is different in that a work implement attitude state determination unit 107 is further added.

Work implement attitude state determination unit 107 determines an attitude state of work implement 3 in response to an operation instruction through operation portion 8.

Figure 24:
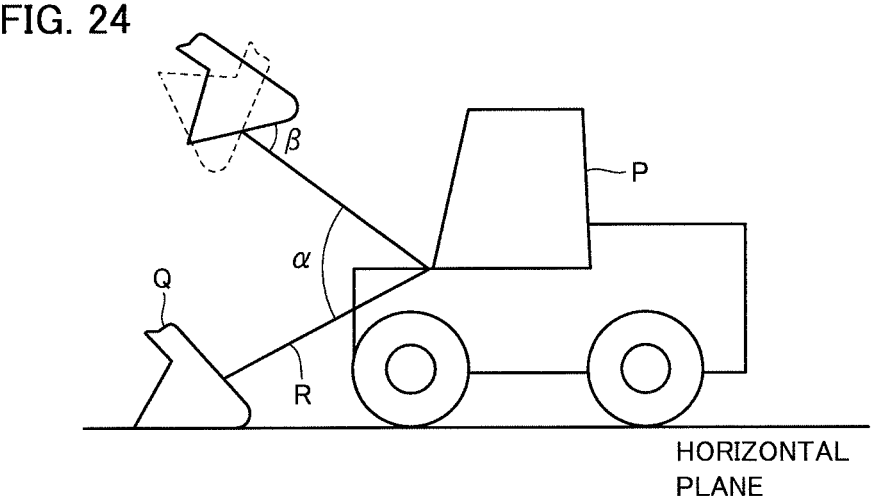
FIG. 24 illustrates a state of modeling of wheel loader 1 based on the second embodiment.

FIG. 24 illustrates a state of modeling of wheel loader 1 based on the second embodiment.

FIG. 24 shows that a main body portion P of the wheel loader, a bucket Q, and a work implement link R connecting main body portion P and bucket Q to each other are modeled.

A state of bucket Q and work implement link R (an attitude state) is varied in response to an operation command through operation portion 8.

By way of example, when a state of bucket Q in contact with a horizontal plane is defined as an initial state, work implement link R lifts bucket Q and rotates the bucket by an angle $\alpha$ in response to an operation command through operation portion 8. An angle of bucket Q is varied and an angle with respect to work implement link R is set to $\beta$ in response to an operation command through operation portion 8.

Angles $\alpha$ and $\beta$ can be calculated based on an amount of operation command through operation portion 8 and work implement attitude state determination unit 107 can determine an attitude state of work implement 3 based on an operation instruction through operation portion 8. An angle sensor may detect angles $\alpha$ and $\beta$ to thereby determine an attitude state of work implement 3. Alternatively, a length of the lift cylinder and a length of the bucket cylinder can be calculated based on a value of a stroke sensor and an attitude state of work implement 3 can be determined based on the lengths.

Blocked region extraction unit 101 specifies a blocked region where the field of view of the operator from the point of view at the operator's seat of wheel loader 1 on the display is blocked based on the attitude state of work implement 3 determined by work implement attitude state determination unit 107 and extracts the blocked region.

Since subsequent processing is the same as described in the first embodiment and the modification thereof, detailed description thereof will not be repeated.

With the scheme based on the second embodiment, a blocked region where the field of view of the operator from the point of view at the operator's seat of wheel loader 1 on the display is blocked can be specified without image analysis, and processing load in extraction of a blocked region can be lessened.

(Third Embodiment)

In the embodiments, a region where a field of view of an operator from a point of view at the operator's seat of the wheel loader on display 50 is blocked is shown as being synthesized in showing image data picked up by camera 40 on display 50.

In a third embodiment, a blocked region is shown as being synthesized with the work implement or the loaded vehicle watched by the operator.

The control unit is basically the same in configuration as control unit 10A based on the modification of the first embodiment.

Figure 25:
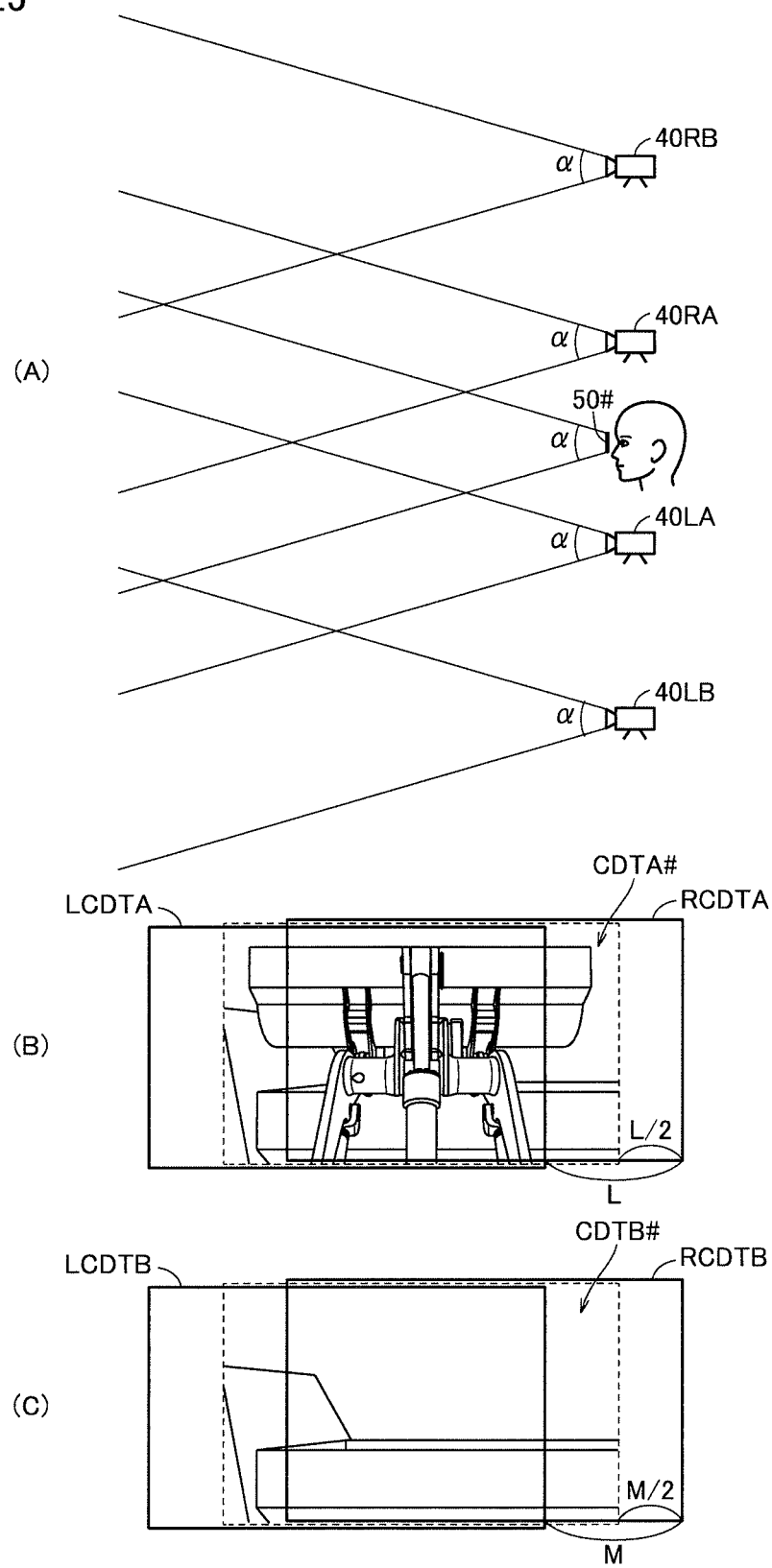
FIG. 25 illustrates the display and a range of image pick-up by a camera based on a third embodiment.

FIG. 25 illustrates the display and a range of image pick-up by a camera based on the third embodiment.

Referring to FIG. 25 (A), cameras 40RA and 40LA are provided on the right and left of a display 50#, respectively. Cameras 40RB and 40LB are provided on the right and left of display 50#, respectively. Camera 40RB is provided at a position more distant from display 50# than camera 40RA. Camera 40LB is provided at a position more distant from display 50# than camera 40LA. Cameras 40RA and 40LA are provided at an equal distance from display 50#. Cameras 40RB and 40LB are provided at an equal distance from display 50#.

Optically transparent (see-through) display 50# is provided in front of an operator. The operator can obtain external information through display 50#.

The present example shows a vertical image pick-up range a from which the operator obtains information through display 50# by way of example.

The vertical image pick-up ranges of cameras 40RA, 40RB, 40LA, and 40LB are also set to be identical.

Though not shown in the present example, a horizontal image pick-up range from which the operator obtains information through display 50# and a horizontal image pick-up range of cameras 40RA, 40RB, 40LA, and 40LB are also set to be identical.

In the present example, by way of example, display 50# is provided as being fixed to wheel loader 1, and positions of display 50# and cameras 40RA, 40RB, 40LA, and 40LB with respect to the horizontal plane are set to be identical in height.

In the present example, the image pick-up ranges of cameras 40RA and 40LA include work implement 3 of wheel loader 1. The image pick-up ranges of cameras 40RB and LB do not include work implement 3 of wheel loader 1.

FIG. 25 (B) illustrates a scheme of extraction of information obtained by the operator through display 50# from image data of the image pick-up ranges of cameras 40RA and 40LA.

FIG. 25 (B) shows image data RCDTA from right camera 40RA and image data LCDTA from left camera 40LA. Image data RCDTA and image data LCDTA are arranged such that any identical points are superimposed on each other. A part of work implement 3 is shown in both of them. When image data RCDTA and image data LCDTA are displaced in a horizontal direction by a length L, the range from which the operator obtains information through display 50# results from displacement of image data RCDTA by L/2 to the left and displacement of image data LCDTA by L/2 to the right. In the present example, information on the range obtained by the operator through display 50# is extracted as image data CDTA#.

Image data the same as image data CDTA described with reference to FIG. 17 is shown as image data CDTA#.

Image data CDTA# is information including a blocked region obtained by the operator through display 50#. A blocked region can be specified based on image data CDTA#.

FIG. 25 (C) illustrates extraction of information obtained by the operator through display 50# from image data of the image pick-up ranges of cameras 40RB and 40LB.

FIG. 25 (C) shows image data RCDTB from right camera 40RB and image data LCDTB from left camera 40LB. Image data RCDTB and image data LCDTB are arranged such that any identical points are superimposed on each other. A part of loaded vehicle 140 is shown in both of them. When image data RCDTB and image data LCDTB are displaced in the horizontal direction by a length M, the range from which the operator obtains information through display 50# results from displacement of image data RCDTB by M/2 to the left and displacement of image data LCDTB by M/2 to the right. In the present example, information on the range obtained by the operator through display 50# is extracted as image data. CDTB#.

Image data the same as image data ICDTA described with reference to FIG. 18 is shown as image data CDTB#.

Image data CDTB# is information not including a blocked region obtained by the operator through display 50#. A perspective image on the line of sight of the operator beyond the blocked region can be obtained based on image data CDTB#.

As described in the modification of the first embodiment, representation on display 50# during a loading work will be described.

During the loading work, the work implement link is extracted as a blocked region.

Image analysis unit 103 specifies the work implement link, for example, through pattern matching based on image data CDTA#.

Blocked region extraction unit 101 extracts the work implement link specified by image analysis unit 103 based on image data CDTA# as the blocked region where the field of view of the operator from the point of view at the operator's seat is blocked.

Image extraction unit 104 extracts the perspective image on the line of sight of the operator beyond the blocked region extracted by blocked region extraction unit 101 based on image data CDTB#.

Image extraction unit 104 extracts the perspective image included in image data CDTB# based on contour line L2 of the work implement link. The perspective image is an image on the line of sight of the operator beyond the blocked region where the field of view is blocked by the work implement link.

Image edition unit 106 edits perspective image 802 so as to be in conformity with a shape of a region within the contour line of blocked region 702 extracted by blocked region extraction unit 101, with the contour line being defined as the boundary.

Representation control unit 105 causes the display 50# to show the perspective image edited by image edition unit 106 as being synthesized with the blocked region where the field of view of the operator from the point of view at the operator's seat of wheel loader 1 on display 50# is blocked, with the contour line of the blocked region being defined as the boundary.

Figure 26:
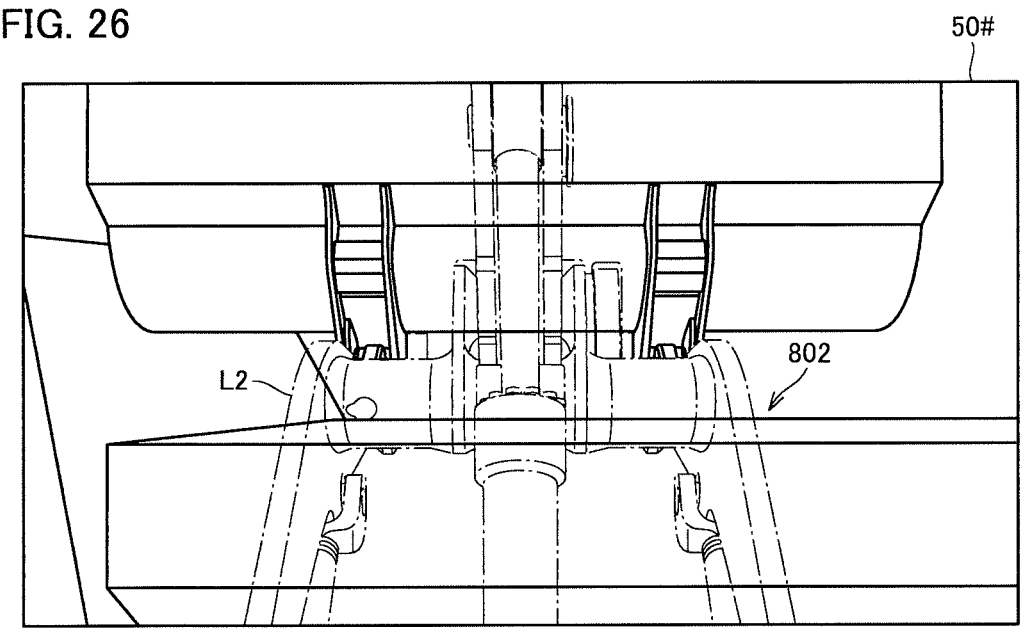
FIG. 26 illustrates one example of a display 50# based on the third embodiment.

FIG. 26 illustrates one example of display 50# based on the third embodiment.

Referring to FIG. 26, in the present example, as described with reference to FIG. 22, the perspective image is synthesized with the region within the contour line of the blocked region with the contour line being defined as the boundary. Therefore, what is called skeletal image representation in which an inner region is seen through while the contour line remains is provided.

A portion of loaded vehicle 140 and work implement 3 shown on display 50# by means of representation control unit 105 is only a portion of perspective image 802 synthesized with blocked region 702. Portions other than that are watched by the operator through see-through display 50# and not shown on display 50#.

Though representation during the loading work is described in the present example, as described in the modification of the first embodiment, during an excavation work and a soil ejection work as well, with the similar scheme, the perspective image edited by image edition unit 106 can be shown on display 50# as being synthesized with the blocked region where the field of view of the operator from the point of view at the operator's seat of wheel loader 1 on display 50# is blocked, with the contour line of the blocked region being defined as the boundary.

With representation on display 50#, the perspective image on the line of sight of the operator beyond the blocked region where the field of view of the operator from the point of view at the operator's seat of the wheel loader on display 50# is blocked can be shown.

Therefore, the operator can intuitively operate work implement 3 and work efficiency can be improved.

Though display 50# is fixed to wheel loader 1 in the present example, a height thereof may be adjusted. For example, cameras 40RA, 40RB, 40LA, and 40LB may be adjusted to the same height in accordance with a height of display 50#.

A direction of line of sight of visual recognition by the operator through display 50# may also be adjustable. Directions of lines of sight of 40RA, 40RB, 40LA, and 40LB may also be adjusted in accordance with an orientation of display 50#.

Though a configuration including four cameras 40RA, 40RB, 40LA, and 40LB is described in the present example, the configuration may be implemented by cameras less than four. In that case, an image pick-up range of the camera includes a range from which the operator obtains information through display 50# and the range is extracted with image analysis processing.

Though display 50# is fixed to wheel loader 1 in the present example, limitation thereto is not particularly intended and a display may be in a form wearable by an operator like what is called a head mounted display.

(Other Forms)

Though the control unit of wheel loader 1 performs main processing for extracting a blocked region and showing the blocked region as being synthesized with a perspective image in the embodiments, wheel loader 1 does not necessarily have to include each functional block of the control unit. Some functional blocks may be provided in a server connected to a network or provided on a side of a loaded vehicle which can communicate data.

Though embodiments of the present invention have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1, 1A wheel loader; 2 vehicular body frame; 2a front vehicular body portion; 2b rear vehicular body portion; 3 work implement; 4a, 4b, 142, 144 wheel; 5, 152 operator's cab; 6 boom; 7 bucket; 8 operation portion; 9 bell crank; 10, 10A, 10B control unit; 11a, 11b steering cylinder; 1.2 steering pump; 13 work implement pump; 14a, 14b lift cylinder; 15 bucket cylinder; 19 communication unit; 21, 146 engine; 22 traveling apparatus; 23 torque converter device; 24 fuel injection pump; 26 transmission; 27 lock-up clutch; 28 torque converter; 31 clutch control valve; 32 shaft; 33 shaft; 34 work implement control valve; 35 steering control valve; 40, 45, 151, 40LA, 40LB, 40RA, 40RB camera; 50, 50#, 503 display; 60 memory; 81a accelerator operation member; 81b accelerator operation detection device; 82a steering operation member; 82b steering operation detection device; 83a boom operation member; 83b boom operation detection device; 84a bucket operation member; 84b bucket operation detection device; 85a transmission operation member; 85b transmission operation detection device; 86a operation member; 86b operation detection device; 91 engine speed sensor; 92 output speed sensor; 93 input speed sensor; 94 to 97 first to fourth hydraulic sensor; 98 boom angle detection device; 100 work state determination unit; 101 blocked region extraction unit; 102 image data obtaining unit; 103 image analysis unit; 104 image extraction unit; 105 representation control unit; 106 image edition unit; 107 work implement attitude state determination unit; 134 communication device; 140 loaded vehicle; 150 actuator; 154 operator's seat; 158 control device; and 160 vessel

The invention claimed is:

1. A control system for a wheel loader comprising:
a bucket that, faces outward relative to, an operator's seat of the wheel loader;
a display that shows an image of an inside of the bucket;
one or more hardware processors configured to cause the system to perform operations comprising:
causing the display to show a perspective image in which at least a part of a work implement of the wheel loader or a vessel of a loaded vehicle is seen through;
extracting least a part of a blocked region where a field of view of e wheel loader is blocked on the display: and
causing the display to show the perspective image beyond the blocked region as being synthesized with the extracted blocked region.

2. The control system for a wheel loader according to claim 1, wherein the operations further comprise:
causing the display to show a contour line of the bucket of the work implement or the vessel as being synthesized with the perspective image.

3. The control system for a wheel loader according to claim 2, wherein the operations further comprise:
causing the display to show the contour line of the bucket from a point of view at the operator's seat as being synthesized with the perspective image of inside of the bucket.

4. The control system for a wheel loader according to claim 2, wherein
causing the display to show the perspective image on a line of sight of the operator beyond the blocked region as being synthesized with a region within a contour line of the blocked region, with the contour line of the blocked region being defined as a boundary.

5. The control system for a wheel loader according to claim 4,
wherein the operations further comprise:
extracting the perspective image on the line of sight of the operator beyond the blocked region based on the image data obtained by the; and
causing the display to show the perspective image as being synthesized with the region within the contour line of the blocked region with the contour line of the blocked region being defined as the boundary.

6. The control system for a wheel loader according to claim 5, wherein the operations further comprise:
extracting the blocked region where the field of view of the operator from the point of view at the operator's seat on the display is blocked by the bucket of the work implement during excavation with the bucket,
extracting the perspective image of inside of the bucket on the line of sight of the operator beyond the extracted blocked region during the excavation, and
causing the display to show the perspective image of the inside of the bucket as being synthesized with the region within the contour line of the bucket, with the contour line of the bucket being defined as the boundary, during the excavation.

7. The control system for a wheel loader according to claim 5, wherein
the work implement includes a work implement link which connects the bucket and a vehicular main body to each other, and
the operations further comprise:
extracting the blocked region where the field of view of the operator from the point of view at the operator's seat on the display is blocked by the work implement link during loading on the vessel,
extracting the perspective image of the part of the vessel on the line of sight of the operator beyond the extracted blocked region during the loading, and
causing the display to show the perspective image as being synthesized with a region within the contour line of the work implement link, with the contour line of the work implement link being defined as the boundary, during the loading.

8. The control system for a wheel loader according to claim 5, wherein the operations further comprise:
extracting the blocked region where the field of view of the operator from the point of view at the operator's seat on the display is blocked by the vessel during soil ejection from the bucket,
extracting the perspective image of inside of the vessel on the line of sight of the operator beyond the extracted blocked region during the soil ejection, and
causing the display to show the perspective image of the inside of the vessel as being synthesized with a region within the contour line of the vessel, with the contour line of the vessel being defined as the boundary, during the soil ejection.

9. The control system for a wheel loader according to claim 8, wherein the operations further comprise:
extracting the blocked region where the field of view of the operator from the point of view at the operator's seat on the display is blocked by the bucket during soil ejection from the bucket,
extracting the perspective image of inside of the bucket on the line of sight of the operator beyond the extracted blocked region during the soil ejection, and
synthesizing the perspective image of the inside of the bucket with the region within the contour line of the bucket, with the contour line of the bucket being defined as the boundary, during the soil ejection, and has the synthesized image shown.

10. The control system for a wheel loader according to claim 1, wherein the operations further comprise:
causing the display to show the contour line of the bucket in a side view as being synthesized with the perspective image of inside of the bucket.

11. The control system for a wheel loader according to claim 1, wherein
the display is an optically transparent display.

12. The control system for a wheel loader according to claim 1, wherein the operations further comprise:
extracting at least a part of the blocked region based on an operation instruction from the operator.

13. The control system for a wheel loader according to claim 1, the control system further comprising a camera provided inside a bucket of the wheel loader, the camera having a line of sight of an inside of the bucket, wherein the operations further comprise:
extracting at least a part of the blocked region where the field of view is blocked by the bucket of the wheel loader on the display and causes the display to show the perspective image of the inside of the bucket picked up by the camera as being synthesized with the extracted blocked region.

14. The control system for a wheel loader according to claim 1, the control system further comprising a camera having a line of sight toward front of the work implement of the wheel loader, wherein the operations further comprise:
extracting at least a part of the blocked region where the field of view is blocked by the work implement of the wheel loader on the display and causes the display to show the perspective image of the front of the work implement picked up by the camera as being synthesized with the extracted blocked region.

15. The control system for a wheel loader according to claim 1, the control system further comprising a camera provided inside the vessel of the loaded vehicle, the camera having a line of sight of an inside of the vessel, wherein the operations further comprise:
extracting at least a part of the blocked region where the field of view is blocked by the vessel on the display and causes the display to show the perspective image of the inside of the vessel picked up by the camera as being synthesized with the extracted blocked region.

16. A control method of a control system for a wheel loader comprising:
receiving image data from an inside of a bucket, wherein the bucket faces outward relative to an operator's seat of the wheel loader;
extracting at least a part of a blocked region where a field of view of an operator from a point of view at the operator's seat of the wheel loader is blocked by at least a part of a work implement or a loaded vehicle from the image data;
synthesizing a perspective image on a line of sight of the operator beyond the extracted blocked region; and
showing the perspective image, which has been synthesized, on a display.

17. A method of controlling a wheel loader comprising:
obtaining picked-up image data from an inside of a bucket, wherein the bucket faces outward relative to an operator's seat of the wheel loader;
extracting at least a part of a blocked region where a field of view of an operator from a point of view at the operator's seat of the wheel loader is blocked by at least a part of a work implement or a loaded vehicle from the image data;
synthesizing a perspective image on a line of sight of the operator beyond the extracted blocked region; and
showing the perspective image, which has been synthesized, on a display.

18. A controls n for a wheel loader comprising:
a display;
a camera mounted inside a bucket of the wheel loader, wherein the camera provides an image of an inside of the bucket;
one or more hardware processors configured to cause the system to perform operations comprising:
causing the display to show a perspective image in which at least a part of a work implement of the wheel loader or a vessel of a loaded vehicle is seen through;
extracting at least a part of a blocked region where a field of view of the wheel loader is blocked on the display; and
causing the display to show the perspective image beyond the blocked region as being synthesized with the extracted blocked region.

* * * * *